US005828879A

United States Patent [19]

Bennett

[11] Patent Number: 5,828,879

[45] Date of Patent: Oct. 27, 1998

[54] METHOD AND A SCHEDULER FOR CONTROLLING WHEN A SERVER PROVIDES SERVICE TO AN ENTITY

[75] Inventor: Jon C. R. Bennett, Pittsburgh, Pa.

[73] Assignee: Fore Systems, Inc., Warrendale, Pa.

[21] Appl. No.: 362,217

[22] Filed: Dec. 22, 1994

[51] Int. Cl.[6] ........................ G06F 9/00

[52] U.S. Cl. ........................ 395/672; 395/673

[58] Field of Search ........................ 395/650, 700, 395/672, 673, 674, 670

[56] References Cited

U.S. PATENT DOCUMENTS

| | | | |
|---|---|---|---|
| 5,142,533 | 8/1992 | Crisler et al. | 370/349 |
| 5,327,558 | 7/1994 | Burke et al. | 395/828 |
| 5,404,523 | 4/1995 | DellaFera | 395/671 |
| 5,414,845 | 5/1995 | Behm | 395/674 |
| 5,428,781 | 6/1995 | Duault | 395/672 |
| 5,485,579 | 1/1996 | Hitz | 395/200.51 |

OTHER PUBLICATIONS

"Dynamic Scheduling of Hard Real-Time Task and Real--time Threads" by Karsten Schwan and Hongyi Zhou// Parallel and Distributed Processing 1990.

"Dynamic Scheduling of Hard Real-Time Tasks and Real time Threads" Karsten Schwan et al. IEEE Symposium 1990, Dec. 9-13.

"Fixed Priority Scheduling of Periodic Tasks with Varying Execution Priority", Harbour et al. Conference 1991, Dec. 4-6.

"Comparison of Rate-Based Service Disciplines", Hui Zhang and Srinivasan Keshav, SIGCOMM '91 Conference, Communications, Architectures and Protocols, Zurich, Switzerland, 3-6 Sep. 1991, vol. 21, No. 4 ISSN 0146-4833, Computer Communication Review, Sep. 1991, USA, pp. 113-121, XP000260077.

"Virtual clocks and leaky buckets: flow control protocols for high-speed networks", Weinrib, A. et al., Protocols for High-Speed Networks, II. Proceedings of the IFIP WG. 6.1/WG 6.4 Second International Workshop, Palo Alto, CA, USA, 27-29 Nov. 1990, ISBN 0-444-88932-9, 1991, Amsterdam, Netherlands, North-Holland, Netherlands, pp. 3-15, XP002049062.

*Primary Examiner*—Majid A. Banankhan

*Attorney, Agent, or Firm*—Ansel M. Schwartz

[57] ABSTRACT

A method for scheduling when a server provides service to entities. The method includes the steps of identifying when a first entity requests service from the server. Next there is the step of providing service to an entity, such as a first entity or a second entity, as a function of when the entity requests service from the server. A scheduler for controlling when a server provides service to entities. The scheduler includes a memory having times which are a function of when entities request service from the server. The scheduler also includes a virtual clock that keeps track of time as a function of when entities request service from the server. The scheduler also includes a controller which causes an entity to receive service from the server as a function of when the entity requests service from the server. A scheduler for scheduling when N entities each of which has a weight w, where N is an integer ≦1 and w is a real number, are served by a server.

20 Claims, 7 Drawing Sheets

METHOD AND A SCHEDULER FOR CONTROLLING WHEN A SERVER PROVIDES SERVICE TO AN ENTITY

FIELD OF THE INVENTION

The present invention is related to a scheduler. More specifically, the present invention is related to a scheduler which allows an entity to receive service from a server before its finishing time.

BACKGROUND OF THE INVENTION

In circumstances where available resources must be shared among a number of different users, problems of congestion can occur for utilization of the resources. Quite simply, there may be times when different users desire to use a given resource at the same time, but the resource's capability only allows it to serve one user at a time. To control this congestion problem, a scheduler is typically utilized to order when a user has access to the server.

Ideally, the scheduler will provide the users access to the server in a fair manner so that no user will experience an undue delay based on its needs. In the past, scheduler's have not necessarily been fair to users when the users have a significant divergence in their needs. Many times, either the user with the greatest needs is left waiting while the user with the lowest needs is being served by the server, and vice versa. The present invention is directed to meeting the needs of users so users having lower needs can be served at times when users of greater needs do not require service at a given time.

SUMMARY OF THE INVENTION

The present invention pertains to a scheduler for controlling when N entities, where N is an integer ≧1, are serviced by a server. The scheduler comprises a starting time memory having starting times $s_i$ of the N entities, where 1≦i≦N and is an integer, and $s_i$ corresponds to the time the i'th entity requests service from the server. The scheduler is also comprised of a finishing time memory having finishing times $f_i$ of the N entities, where $f_i$ corresponds to the time the i'th entity should be serviced by the server. The scheduler is also comprised of a virtual clock that keeps track of time so the starting times $s_i$ and finishing times $f_i$ can be identified. Additionally, the scheduler comprises a controller which chooses entities to receive service from the server in the order of the entities with an earliest finishing time $f_i$ and a starting time $s_i$ being serviced first, and then the entities with the earliest or latest starting time $s_i$ or having the highest or lowest id or rate if their finishing times are the same being serviced next at each given time. As is apparent from the latter, if the entities' finishing times are the same, then whatever protocol is desired to indicate which entity is to be provided to the server to be operated upon is the choice of the operator.

The present invention pertains to a method of scheduling when a server provides service to entities. The method comprises the steps of requesting service from the server by N entities, where N≧1 and is an integer. Then there is the step of storing when each of the N entities starts requesting service and when each of the N entities should have received service. Next, there is the step of providing service to an entity of the N entities which has the earliest receive time and start time, unless there is more than one entity with the earliest receive time in which case the entity with the earliest start time receives service and possibly before its receive time.

The present invention pertains to a scheduler for scheduling when N entities each of which has a weight w, where N is an integer ≧1 and w is a real number, are served by a server. The scheduler is comprised of a starting time memory having starting times $s_i$ when the N entities request service, where 1≦i≦N and is an integer, and $s_i$ is the time at which the i'th entity may next get service from the server. The scheduler is also comprised of a finishing time memory having finishing times $f_i$ when the N entities should be serviced, where $f_i$ is the time by which the i'th entity should be serviced by the server. The scheduler is also comprised of a virtual clock that keeps track of time $V_k$ where k>0 and is an integer and $$V_k=\mathrm{MAX}((V_{k-1}+P)+(1*X)+((1/AW)*T),\ (S_{Smin}*Y)+((f_{Fmin}-S_{Smin})*Z))\ \text{where}(|P|+|T|\notin|X|)*(|Y|+|Z|)>0$$

where $s_{Smin}$ is the earliest start time $s_i$ of when an entity requests service from the server; $f_{Fmin}$ is the earliest finish time of an entity waiting for service from the server; $V_{k-1}$ is the virtual time when the server last served an entity; AW=sum over all entities currently asking for service of $w_i$, where $w_i$ is the i'th entity's weight; and P, X, T, Y and Z are real numbers. Preferably, P=1, T=0, X=1, Y=1 and Z=0, but based on the application and the purpose, either T or X can be essentially any real number as long as both are not 0; and either Y or Z can be essentially any real number as long as both are not 0.

The scheduler is also comprised of a controller which chooses which entity is to be operated upon by the server in the order of the entity with an earliest finishing time $f_i$ and a start time $s_i$ receiving service first, and then the entities based on a predetermined criteria. The predetermined criteria can essentially be any type of tie-breaking procedure that the user wishes to apply such as earliest start time or id number, etc.

The present invention pertains to a method for scheduling when a server provides service to entities. The method comprises the steps of identifying when a first entity requests service from the server. Next there is the step of providing service to an entity, such as a first entity or a second entity, as a function of when the entity requests service from the server.

The present invention pertains to a scheduler for controlling when a server provides service to entities. The scheduler comprises a memory having times which are a function of when entities request service from the server. The scheduler is also comprised of a virtual clock that keeps track of time as a function of when entities request service from the server. The scheduler is also comprised of a controller which causes an entity to receive service from the server as a function of when the entity requests service from the server.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
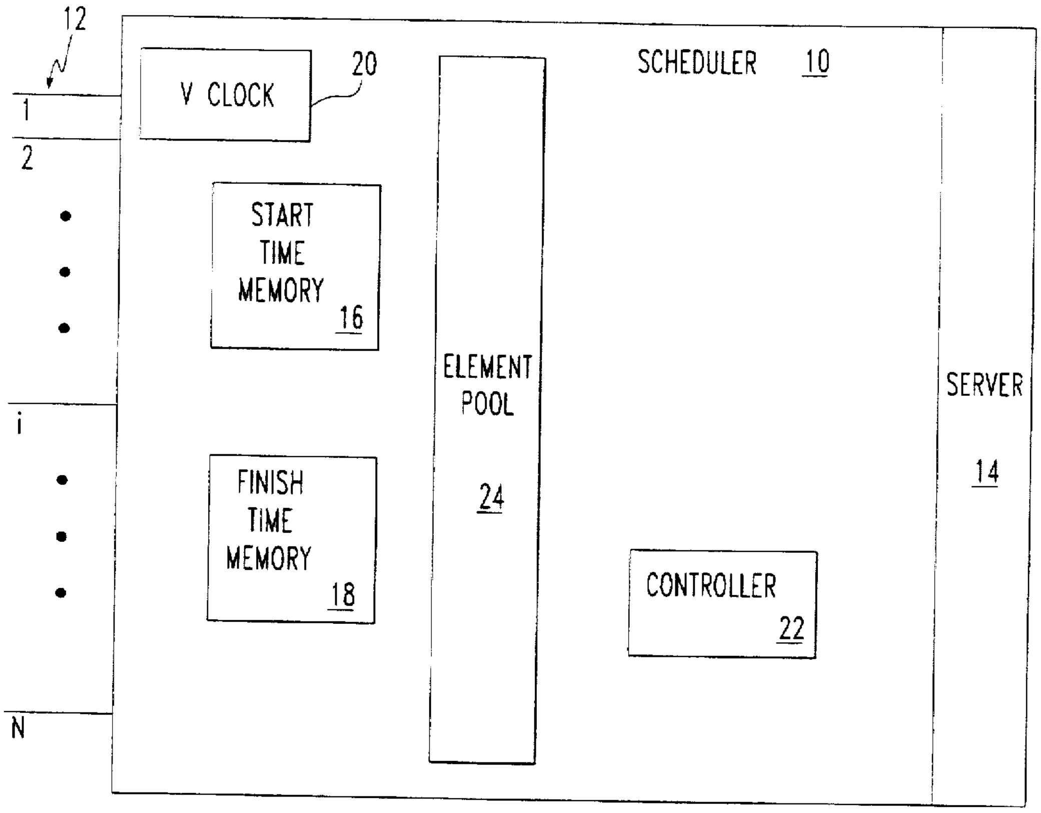
FIG. 1 is a schematic representation of the present invention.

Referring now to the drawings wherein like reference numerals refer to similar or identical parts throughout the several views, and more specifically to FIG. 1 thereof, there is shown a scheduler 10 for controlling when N entities 12, where N is an integer ≧1, are operated upon by a server 14. The scheduler 10 comprises a starting time memory, such as a priority queue 16, having starting times $s_i$ of the N entities, where 1≦i≦N and is an integer, and $s_i$ corresponds to the time the i'th entity starts requesting service from the server 14. The scheduler 10 is also comprised of a finishing time memory, such as a priority queue 18, having finishing times $f_i$ of the N entities 12, where $f_i$ corresponds to the time the i'th entity should be operated upon by the server 14. The scheduler 10 is also comprised of a virtual clock 20 that keeps track of time so the starting times $s_i$ and finishing times $f_i$ can be identified. Additionally, the scheduler 10 comprises a controller 22 which provides entities service from the server 14 in the order of the entities with an earliest finishing time $f_i$ and a start time $s_i$ being operated upon first, and then the entities with the earliest or latest starting time $s_i$ or having the highest or lowest id or rate if their finishing times are the same being operated upon next at each given time. As is apparent from the latter, if the entities' finishing times are the same, then whatever protocol is desired to indicate which entity is to be provided to the server 14 to be operated upon is the choice of the operator.

Preferably, scheduler 10 can include an element pool 24 which is connected with the N entities 12 and receives elements from the N entities 12 to be operated upon by the server 14. The arrival times $s_i$ of elements then corresponds to the time elements from the i'th entity 12 arrives in the element pool 24 and the finishing times $f_i$ correspond to the time an element from the i'th entity 12 is to leave the element pool 24 and be operated upon by the server 14.

The controller 22 transfers or chooses elements to be operated upon by the server 14 from the element pool 24. Preferably, the controller 22 is connected to the virtual clock 20, the element pool 24, the starting time priority queue 16 and the finishing time priority queue 18 for controlling time of the virtual clock 20, storing the elements in the element pool 24, and the arrival times $s_i$ and their finishing times $f_i$ in the starting time priority queue 16 and the finishing time priority queue, respectively. The controller 22 preferably operates upon entities or elements of the element pool 24 sequentially. Preferably, the controller 22 causes the virtual clock 20 to move present virtual time forward when an entity receives service or an element leaves the element pool 24. The controller 22 can cause the virtual clock 20 to increment virtual time to the earliest starting time of an entity or an element if the earliest start time of an entity is later than virtual time, otherwise, the controller 22 causes the virtual clock 20 to increment virtual time by a unit of virtual time. In the embodiment with an element pool 24 present, the controller 22 transfers the element out of the element pool 24 which has the earliest finishing time $f_i$ and a starting time $s_i$ unless there is more than one element with the earliest finishing time $f_i$, in which case, preferably, the element with the earliest starting time $s_i$ is transferred out of the element pool 24 by the controller 22 and before its finishing time $f_i$.

The present invention pertains to a scheduler 10 for scheduling when N entities each of which has a weight w, where N is an integer ≧1 and w is a real number, are served by a server 14. The scheduler 10 is comprised of a starting time memory 16 having starting times $s_i$ when the N entities 12 request service, where 1 ≦i≦N and is an integer, and $s_i$ is the time at which the i'th entity may next get service from the server 14. The scheduler 10 is also comprised of a finishing time memory 18 having finishing times $f_i$ when the N entities should be serviced, where $f_i$ is the time by which the i'th entity should be serviced by the server 14. The scheduler 10 is also comprised of a virtual clock 20 that keeps track of time $V_k$ where k≧0 and is an integer and $$V_k=\mathrm{MAX}((V_{k-1}+P)+(1*X)+((1/AW)*T),\ (S_{Smin}*Y)+((f_{Fmin}\text{-}S_{min})*Z))\quad \text{where}(|P|+|T|+|X|)*(|Y|+|Z|)>0 \tag{1}$$

where $s_{Smin}$ is the earliest start time $s_i$ of when an entity requests service from the server 14; $f_{Fmin}$ is the earliest finish time of an entity waiting for service from the server 14; $V_{k-1}$ is the virtual time when the server 14 last served an entity; AW=sum over all entities currently asking for service of $w_i$, where $w_i$ is the i'th entity's weight; and P, X, T, Y and Z are real numbers. Preferably, P=1, T=0, X=1, Y=1 and Z=0, but based on the application and the purpose, either T or X can be essentially any real number as long as both are not 0; and either Y or Z can be essentially any real number as long as both are not 0.

The scheduler 10 is also comprised of a controller which chooses which entity is to be operated upon by the server 14 in the order of the entity with an earliest finishing time $f_i$ and a start time $s_i$ receiving service first, and then the entities based on a predetermined criteria. The predetermined criteria can essentially be any type of tie-breaking procedure that the user wishes to apply such as earliest start time or id number, etc.

More specifically, let wi be the "weight" of the i'th entity where $0<w_i<=1$. $W_i$ represents the fractional share of the server 14 which the i'th entity is entitled to (if $w_i=1$ then the server 14 is totally dedicated to the i'th entity, if $w_i=0.5$ then ½ of the server's work is dedicated to the i'th entity). Note: in this context "1" is used to represent the maximum rate of work of the server 14, so it makes no sense to give a single entry a weight which would be equal to greater than 100% of the capacity of the server 14).

Preferably, the sum of the weights of all entities will be less than or equal to 1 if the entities are not restricted as to how much work they can ask the server 14 to perform. This is equivalent to not allocating more than 100% of the server 14 capacity. If an entity is somehow restricted from asking for more than some fraction (say $RS_i<1$) of the server's capacity, then a more general statement is that the sum (over all entities) of MIN($w_i$, $RS_i$) should be less than 1. Let W=sum over all entities of $w_i$ $$w=\sum_{1}^{N} w_i$$

Let AW=sum over all entities current asking for service of $w_i$ (i.e. if "W" is sum of Weights then "AW" is sum of Active Weights)

$$AW=\sum_{1}^{N} w_i*a_i$$

where $a_i=0$ if not asking for service, $a_i=1$ if asking for service.

Additionally, $s_i$ is the time at which the i'th entity may next get service and $f_i$ is the time by which the i'th entity should be serviced.

Let $u_i$ be the number of units of work that the server gives the i'th entity when it does work for the i'th entity (for simplicity assume the case where for all entities $u_i=1$ (in the case of a packet network this is equivalent to the case where all packets are of the same size, i.e. ATM cells)). $U_i$ can be different than one based on the application. For instance, $u_i$ may not be equal to one in a packet based network.

Let $F_{min}$ ($1<F_{min}<N$)=id # of entity with the smallest finishing time (all examples given as "entity with the smallest finishing time" is understood to mean "entity that is to finish first based on any needed tie breaking").

So $f_{Fmin}$=value of the finishing time of the entity with the smallest finishing time.

Let $S_{min}$ ($1<=Smin<N$)=id # of entity with the smallest starting time (what is meant here is the same as above, i.e. if there are ties assume that they are broken somehow).

So $s_{Smin}$=value of the starting time of the entity with the smallest starting time.

$V_k$ indicates the k'th time that the server does work.

$$V_k=MAX(V_{k-1}+(1*X), (s_{Smin}*Y)+((f_{min}-s_{Smin})*Z) \quad (2)$$

Each time the server 14 performs work, it services the entity whose id # is Fmin. The server does not need to know the value of Smin to operate, it only needs to know the value of $s_{Smin}$. Another equation is:

$$V_i=MAX(V_{k-1}+((1/AW)*T), (s_{Smin}*Y)+((f_{Fmin}-s_{Smin})*Z)) \text{ where } (|T|*(|Y|+|Z|)>0 \quad (3)$$

Equation (1) is Equations (2) and (3) together.

Equation (1) with

```
   :
---+---+
 P:  1
 T:  0
 X:  1
---+---
 Y:  0
 Z:  0
   :
```

is "Virtual Clock" (VC). See Zhang, L. (1989) "A new architecture for packet switching network protocols". Report LCS TR 455, Laboratory for Computer Science, Massachusetts Institute of Technology, Cambridge, Mass., incorporated by reference.

Equation (1) with

```
   :
---+---+
 P:  0
 T:  0
 X:  0
---+---
 Y:  1
 Z:  1
   :
```

is "Self-Clocked Fair Queueing" (SFQ). See "A Self-Clocked Fair Queueing Scheme for Broadband Applications" by S. J. Golestani, In Proc. IEEE Infocom, May 1994, incorporated by reference.

It is worth noting that in this case, the second half of the equation looks like $$(S_{Smin}*1)+((f_{Fmin}-s_{Smin})*1)) \text{ or } s_{Smin}+f_{Fmin}-s_{Smin} \text{ or } f_{Fmin}$$

(and in this case the value "$s_{Smin}$" is not actually needed) and in fact, this is how it is conceptually described in the literature Equation (1) with

```
   :
---+---+
 P:  1
 T:  1
 X:  0
---+---
 Y:  0
 Z:  0
   :
```

is "approximately" "Weighted Fair Queueing" (WFQ). See "Analysis and Simulation of a Fair Queueing Algorithms" by A. Demers, S. Keshav, and S. Shenker; Internetworking: Research and Experience, Vol. 1, 3–26 (1990), incorporated by reference, and A. K. J. Parekh, A Generalized Processor Sharing Approach to Flow Control in Integrated Services Networks, Ph.D. Dissertation, Massachusetts Institute of Technology, Cambridge, Mass., February 1992, incorporated by reference.

The real problem with this version from an implementation point of view is two-fold.

a) the computation of "AW" in this case usually requires emulating the fluid model rather than the discrete model of the server b) the computation 1/AW is very expensive, and difficult to perform (if AW=(1−epsilon) then 1/AW=1/(1−epsilon) which is hard to compute accurately)

Equation (1) with

```
   :
---+---+
 P:  1
 T:  0
 X:  1
---+---
 Y:  1
 Z:  0
   :
```

is "Virtual Service Queueing" (VSQ) of the present invention.

The reason for making these observations is two-fold.

a) observing that the pairs P,T,X and Y,Z represent the two halves of the MAX function, it is clear that only VSQ has non-zero coefficients on both sides of the function.

b) if the function is rewritten in the case of SFQ to be the way that the equation is normally written in the literature then it is also clear that only VSQ utilizes the value $s_{Smin}$.

Figure 22:
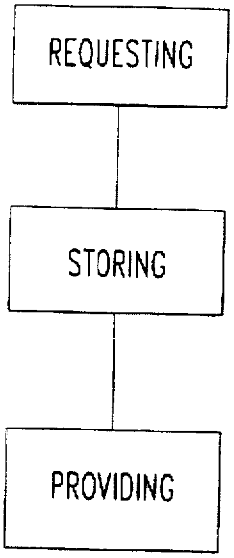
FIG. 22 is a flow chart of a method of scheduling when a server provides service to entities of the present invention.

The present invention pertains to a method of scheduling when a server 10 operates on entities, as shown in FIG. 22. The method comprises the steps of requesting service of the server from N elements, where N>1 and is an integer. Then there is the step of storing when each of the N entities first requests service and when each of the N entities is to have received service from the server. Next, there is the step of providing service to an entity of the N entities which has the earliest receive time and a request time, unless there is more than one entity with the earliest receive time in which case the entity with the earliest request time receives service from the server. Preferably, after the providing step, there is the step of repeating the providing step in regard to other entities. The controller 22 can cause the steps to be implemented.

Figure 23:
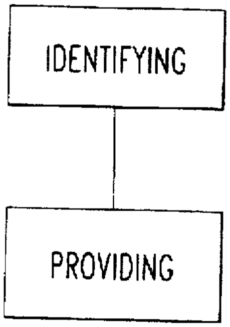
FIG. 23 a flow chart of an alternative method of scheduling when a server provides service to entities of the present invention.

The present invention also pertains to a method for scheduling when a server 14 provides service to entities, as shown in FIG. 23. The method comprises the steps of identifying when an entity requests service from the server 14. The process for identifying when a first entity requests service from the server can include any technique or method for calculating when the first entity requests service from the server 14. This can include identifying when the request occurs by actually determining the time when the entity requests service from the server 14. Or, it can be calculated from when a previous entity has requested service from the server 14 and determined by some function or relationship when the entity requests service from the server 14. Or, it can be determined as a function of another entity which is currently receiving service from the server 14. Alternatively, the time when the first entity requests service can be identified from a time when the entity is to receive service from the server 14. For instance, start time plus $1/W_i$ equals finish time.

Additionally, the identifying step can be part of a calculation where at some point in the overall process of identifying time for the server to provide service to the entity, the time when the entity requests service from the server is identified. Basically, the identifying step can be a conclusion to a process or as an interim step to a process. The entity preferably is a first entity which requests service from the server 14.

The method for scheduling when a server 14 provides service to entities next comprises the step of providing service to an entity as a function of when the entity requests service from the server 14. The entity can be the first entity and it receives service from the server 14 as a function of when the first entity requests the service from the server 14. It is preferably when the first entity first requests service from the server 14 that is a basis for providing service to the first entity. Alternatively, the step of providing service to an entity can be the step of providing service to a second entity as a function of when the first entity requests service from the server 14. The time when the second entity receives service is then some functional relationship of when the first entity first requested service from the server 14. For instance, if service is provided to the first entity at V=1, then service to the second entity is provided at time V=2 or V=1+1, where V=1 is the time the first entity requests service from the server 14.

The present invention pertains to a scheduler for controlling when a server provides service to entities. The scheduler comprises a memory, having times which are a function of when entities request service from the server 14. The scheduler 10 also comprises a virtual clock 20 that keeps track of time as a function of when entities request service from the server 14. Additionally, the scheduler 10 comprises a controller 22 which causes an entity to receive service from the server 14 as a function of when the entity requests service from the server 14. The memory can be a starting time, such as a priority queue 16.

In the operation of the invention, several users receive service from a server 14. The users have cells which either at separate times or at the same time require the operation of the server 14. As long as no user having cells calls upon the server 14 at the same time, or are waiting for the server 14, a user will request service from the server 14 and receive service from it. However, if this is not the case, then a scheduler 10 will schedule when the users with cells will be served by the server 14.

During operation, the scheduler 10 logs in the time a user first requests service from the server 14. The scheduler 10 also logs in the latest time the user should finish waiting for service from the server 14. The scheduler 10 records the start time and the finish time for each user that requests service from the server 14. This information is obtained from the user and from the virtual clock 20 identifying when the user has first started waiting for the service from the server 14. This can occur by the entity sending a signal to the server 14 or the scheduler 10 when it requests service; or by the scheduler 10 or the server 14 using a sensor, or trigger to identify when the entity is requesting service. This aspect of the invention can be similar to how a telecommunications switch operates to switch signals which arrive at the switch from several connections, as is well known in the art.

When the server 14 is available to service a user, the scheduler 10 determines which user of the users waiting for service from the server 14 has the earliest finishing time. The user with the earliest finishing time is then provided service by the server 14 and the user's cell is operated upon by the server 14. If the users have the same finishing time, then the server looks at which user has the earliest start time and provides service to the user with the earliest start time. The scheduler 10 causes the user to receive service from a server 14 even though its time to finish waiting for service may not as yet have occurred.

As each user is served by the server 14, the scheduler 10 looks for the next user to receive service from the server 14. A user that has a high rate will receive service from the server 14 more often than a user with a lower rate. However, as the user with the higher rate receives service from server 14, there will be instances where a user with a lower rate will receive service from the server 14 because it will have an earlier finish time and/or an earlier start time than a user with a higher rate. Because the scheduler 10 is not controlled by the user receiving service from the server 14 when its finish time occurs, users with lower rates can receive service from the server 14 intermittently when the server 14 is not providing service to a higher rate. Thus, because the server 14 is controlled by the fact that over a given unit cycle of operation, it has certain service capability, and that all the rates of the different users combine to equal that unit rate for the cycle, then over the course of a cycle, each user will have service provided by the server 14.

Figure 2:
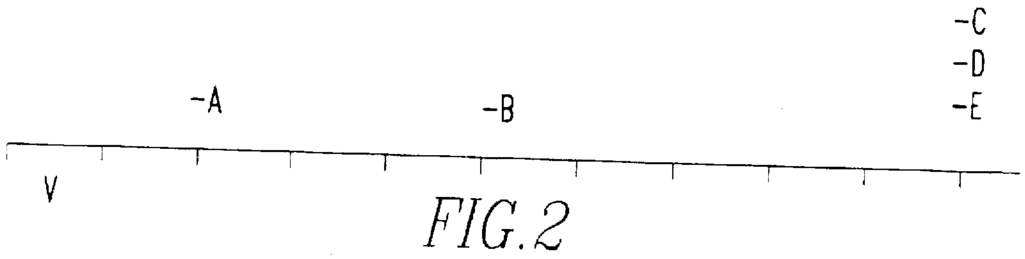
FIGS. 2–11 are schematic representations of cells waiting for service from a server as a function of virtual time.

As a simple example, five users A–E have rates of 0.5, 0.2, 0.1, 0.1, 0.1, respectively. At time V=0, each user A–E has a cell which arrives for service from a server 14. The cell from user A has a finishing time of V=2, the cell from user B has a finishing time of V=5, and the cells from users C, D and E have finishing times of V=10. This is shown in FIG. 2.

At time V=0, since the cell from user A is present and it has the earliest finishing time of V=2 of all the cells waiting for service, the server 14 services user A. Because the server 14 services user A, the time is advanced one unit to V=1.

Figure 3:
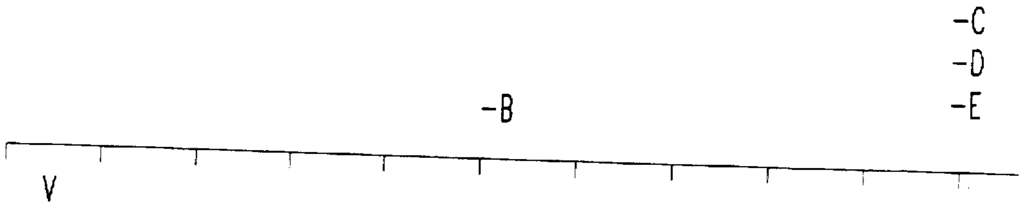

At time V=1, the server 14 serves the cell from user B, since it has the earliest finishing time of V=5, as shown in FIG. 3. Since the server 14 operates on the cell of user B, the time is incremented by one unit so V=2.

Figure 4:
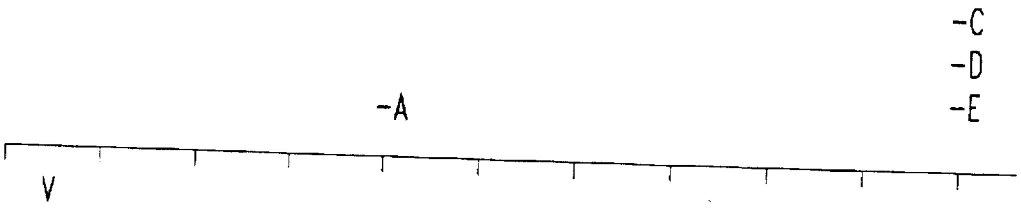

At V=2, a cell from user A arrives having a start time of V=2 and a finish time of V=4, as shown in FIG. 4. At V=2, the server 14 services the cell from user A because the finishing time for the cell of user A of V=4 has the earliest finish time. When server 14 operates on the cell of user A, the time is advanced to V=3.

Figure 5:
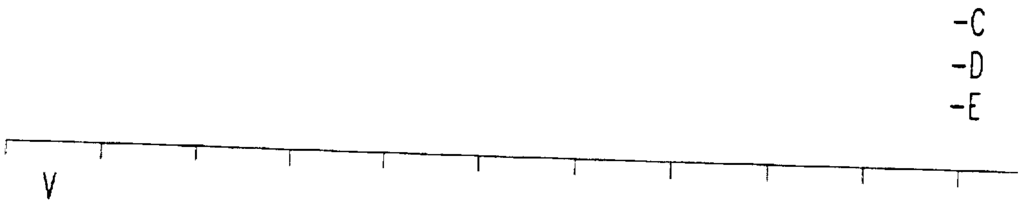

At time V=3, the server 14 operates on the cell from user C since it has as early a finish time of V=10 as any of the cells waiting for service, as shown in FIG. 5. Upon the server 14 serving the cell from user C, the time is advanced to V=4.

Figure 6:
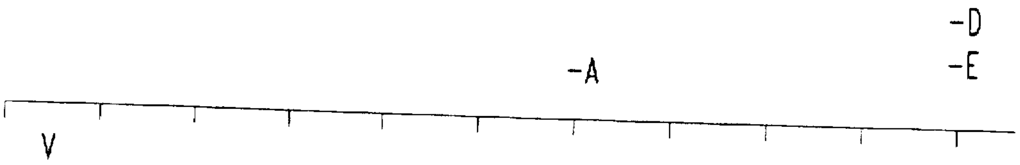

At time V=4, a cell from user A arrives to be serviced by the server 14. It arrives at time V=4 and has a finish time of V=6, as shown in FIG. 6. The server 14 serves the cell from user A since it has the earliest finish time of V=6. The time is then advanced to V=5.

Figure 7:
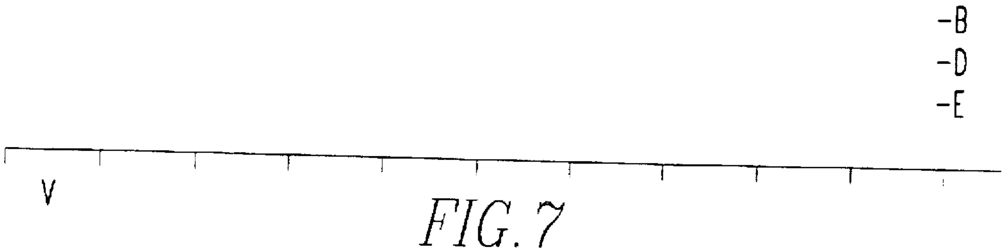

At time V=5, a cell from user B arrives to receive service from server 14. The cell has a start time of V=5 and a finish time of V=10. At time V=5, the server 14 provides service to the cell from user D since all the cells waiting for service have the same finish time but the cell from user D has a start time of 0, which is as early as a cell from user E but earlier than the cell from user B. See FIG. 7. After the server 14 services the cell from user D, the time is advanced to V=6.

Figure 8:
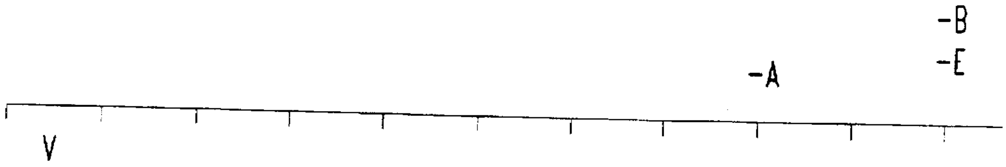

At time V=6, a cell from user A arrives for service from server 14. The cell has a starting time of V=6 and a finish time of V=8. The server 14 provides service to the cell from user A since the cell has the earliest finish time of the cells waiting for service from server 14. See FIG. 8. Upon servicing by the server of the cell from user A, the time is advanced to V=7.

Figure 9:
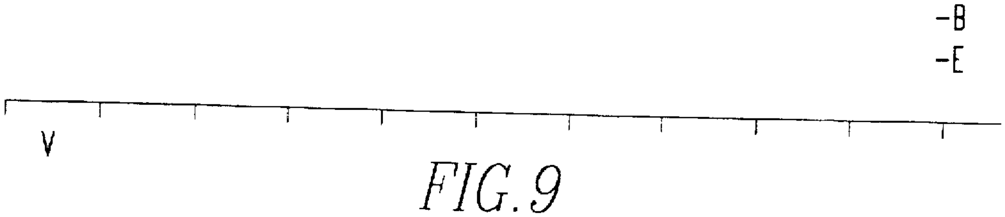

At time V=7, the server 14 provides service to the cell from user E since it has the earliest start time of V=0 and the same finish time as the cell from user B waiting for service from the server 14. See FIG. 9. After the server 14 provides service to the cell from user E, the time is advanced to V=8.

Figure 10:
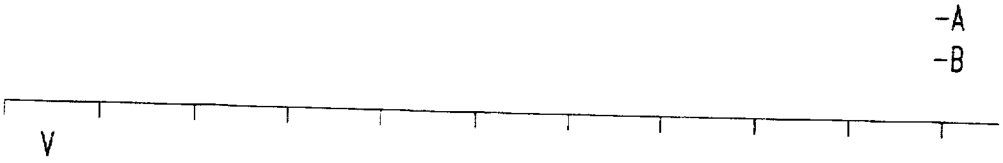

At time V=8, a cell from user A arrives for service from the server 14. At time V=8, the server 14 provides service to the cell from user B since it has the earliest start time of V=5 and the same finish time as the cell from user A waiting for service from the server 14. See FIG. 10. After the server 14 provides service to the cell from user B, the time advances to V=9.

Figure 11:
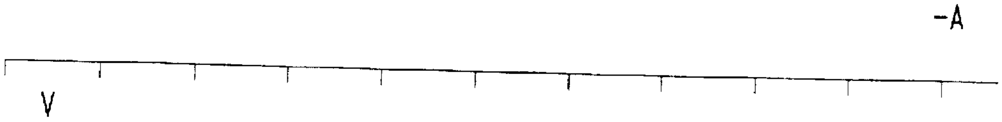

At time V=9, the server 14 provides service to the cell from user A since it has the earliest finish time of any cells waiting for service from the server 14. See FIG. 11. See FIG. 11. At this point in time, a unit cycle has been completed and all the users have received service. After the server 14 provides service to the cell of user A, the time advances to V=10.

At time V=10, a cell from user A arrives for service with a finish time of V=12, a cell from user B arrives for service with a finish time of V=15, and a cell from each of users C, D and E arrive with finish times of V=20 (not shown). The cycle then repeats itself as described above.

Another simple example that describes operation of the scheduler when the rates of the users add to be less than one is now given. In this example, there are three users A-C having rates of 0.5, 0.2 and 0.1, respectively.

Figure 12:
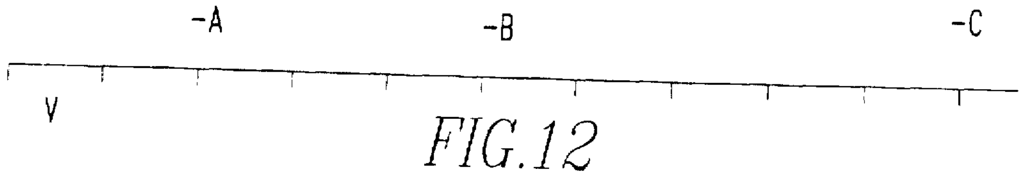
FIGS. 12–20 are schematic representations of cells waiting for service from a server as a function of virtual time.

At time V=0, cells from user A, B and C have arrived having start times of V=0. The cell from user A has a finish time of V=2, the cell from user B has a finish time of V=5, and the cell from user C has a finish time of V=10. See FIG. 12. At V=0, the cell from user A receives service from server 14 since it has the earliest finishing time of V=2 of the cells. Because the server 14 services user A, the time is advanced one unit to V=1.

Figure 13:
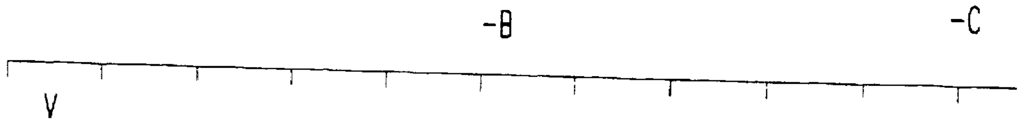

At V=1, the server 14 services the cell from user B, since it has the earliest finishing time of V=5 of the cells. See FIG. 13. The time is then advanced by one increment to V=2.

Figure 14:
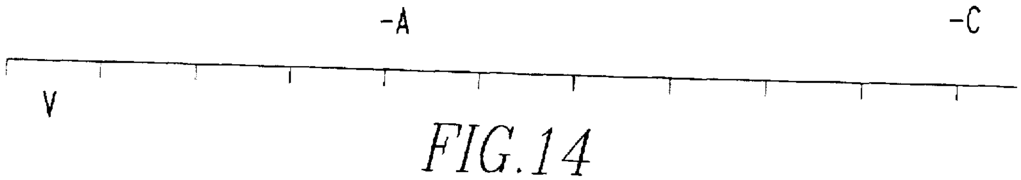

At time V=2, a cell from user A arrives for service from the server 14. The server 14 services the cell from user A since it has the earliest finish time of V=4 of the cells. See FIG. 14. The time is then advanced by one increment to V=3.

Figure 15:
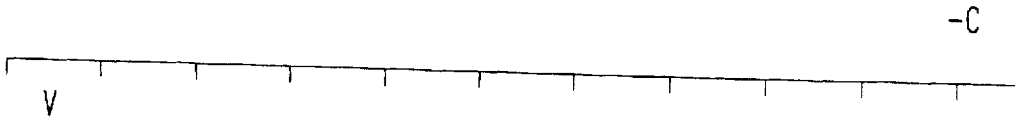

At time V=3, the server provides service to the cell from user C since it is the only cell that has a starting time earlier than the present virtual time of V=3 and it also has a finish time of V=10. See FIG. 15.

After the server 14 services the cell from user C, the virtual time is advanced by one increment to the earliest starting time of a cell that requires service from the server 14. In this case, the earliest starting time of a cell waiting for service is V=4, which happens to be one increment of time from V=3.

Figure 16:
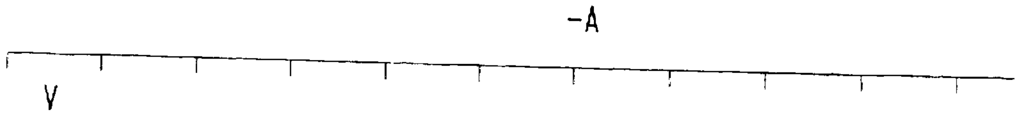

At time V=4, a cell from user A arrives for service from the server 14. The server 14 provides service to the cell from user A since it has a start time of V=4, which is equal to the present virtual time, and has a finish time of V=6 which is the earliest finishing time of any cell waiting for service from the server 14. See FIG. 16. Upon the server 14 providing service to the cell from user A, there being no other cells having starting times earlier or at the present virtual time of V=4, the virtual time is incremented to the earliest start time of a cell that desires service from server 14. In this case, the virtual time is incremented by one unit to V=5 since the cell from user B will have a start time of V=5 when it requests service from the server 14.

Figure 17:
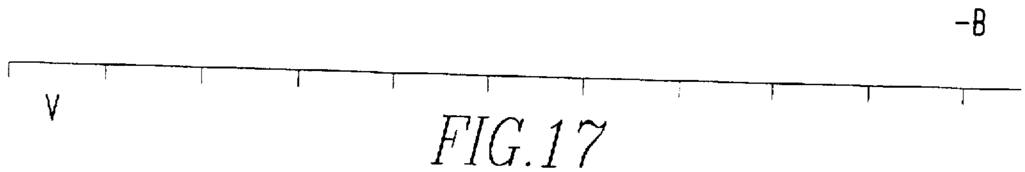

At time V=5, a cell from user B arrives for service from server 14. At time V=5, the server from server 14 provides service to the cell from user B since the cell from user B has the earliest finish time of any cell waiting for service from server 14. See FIG. 17. Upon the server 14 providing service to the cell from user B, the virtual time is incremented to the next virtual time that corresponds to the earliest start time that a cell would require service from the server 14. In this instance, a cell from user A has a start time of V=6. Accordingly, time is incremented by one unit to V=6.

Figure 18:
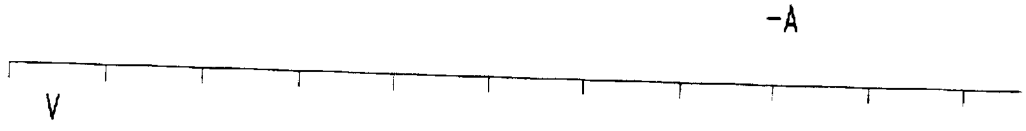

At time V=6, a cell from user A arrives for service from server 14. At time V=6, the server 14 provides service to the cell from user A because it has the earliest finish time. See FIG. 18. The virtual time is then incremented to V=8 and not to V=7 since the earliest start time of a cell waiting for service from server 14 will occur at V=8. Thus, the virtual time is incremented by two units in this instance.

Figure 19:

At time V=8, a cell from user A arrives for service from the server 14. Server 14 provides service to the cell from user A since it has the earliest finish time. See FIG. 19. After the server 14 provides service to the cell from user A, time is incremented to V=10 since at V=10 is the earliest start time for cells waiting for service from server 14. The virtual time is then incremented by two units from V=8 to V=10.

Figure 20:
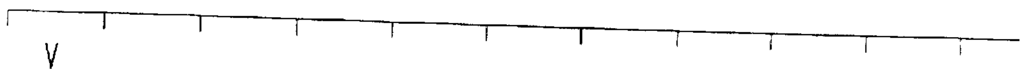

At V=10, cells from users A, B and C arrive for service from server 14. The finish time for the cell from user A is V=12, the finish time for the cell from user B is V=15 and the finish time for the cell from user C is V=20 (not shown). At V=10, there are no cells appearing for service since the figure only goes up to V=10 but V=10 is shown in FIG. 20 since there are finish times associated with V=10, although they are not shown.

Several examples of the implementation of the invention are found in the appendix. Note, the RC before VSQ stands for rate control in two of the examples. To better understand these examples which show elements which are preferably cells in regard to an ATM network arriving into an element pool 24 to be operated upon by a server 14, several operations of the scheduler 10 will be described.

In example 1, there are three entities 12 connected to an element pool 24. These entities 12 have associated with them a weight and a rate. For instance, user 0 associated with the 0th entity 12 has a weight of 0.5 and a rate of 0.5. User 1 associated with the first entity 12 has a weight of 0.333 and a rate of 0.333. User 2 associated with the second entity 12 has a weight of 0.166 and a rate of 0.166. At time T=1, the virtual time is 0. Cells 000, 001 and 002, corresponding with the 0th, 1st, 2nd entities 12 of the 0th, 1st and 2nd users arrive at the element pool 24. Their start times when they first started in the element pool 24 and their finish times when they are to have left the element pool 24 are recorded in the starting priority queue 16 and the finishing time priority queue 18, respectively. This is shown in the start time column and the finish time column and the start queue column and the finish queue column.

In the start time column, user 0 has the second or last position in regard to when the cell 000 associated with the 0th user arrived in the element pool 24. The time that the element arrived in the element pool is at time T=0. In the finish time column, the user 0 has the first or 0th position, since its finish time of T=2000 is the earliest finishing time of all the elements in the element pool 24. For user 0, there is a quantity Q identified in the column Q showing there is but 1 cell of user 0 in the element pool 24. In the start queue column, user 0 is in the last or second position and its starting time T=0. However, in the finishing time priority queue 18 under the finish queue column, user 0 is in the 0th position because the time T=2000 is the earliest finishing time of all the elements in the element pool 24.

In regard to user 1, it has a start time position of 1 and an associated start time T=0. Its finish time position is also 1 because its finish time of T=3000 is the second earliest finishing time of the three cells in the element pool 24. There is a quantity of one cell in the element pool 24 associated with user 1 and in the starting time priority queue 16, the user 1 is in the 1 position with its time T=0. User 1 also has the 1 position in the finish queue column since its time to finish is the second earliest of the cells in the element pool 24.

User 2 has the earliest or 0th position in the starting time priority queue 16 and has time T=0. It has a finishing time position of last or 2 since its time T=6000 is the latest finish time of all the cells in the element pool 24. The user 2 has a quantity Q of one cell in the element pool 24 and a start queue position of 0 with a time T=0. In the finishing time priority queue 18, it has a finish queue position of 2 because its finish time of T=6000 is the latest finishing time of the three cells in the element pool 24.

In operation at time 0000, the cell of user 0 is operated upon by the server 14. This is reflected by the user 0 having a start time of −1 with a time T=0 and a finish time of position −1 for time T=2000. The quantity Q of user 0 is now 0 since its corresponding cell has been operated upon by the server 14 and is no longer in the element pool 24. In the starting time priority queue 16, the user 0 has a position of −1 with a time T=−1 reflecting the fact that the user 0 is no longer present in the element pool. The finishing time priority queue 18 also reflects the finishing queue of user 0 having a −1 in the element pool 24 since the cell associated with user 0 is no longer present in the element pool 24. Because the server can only operate on one cell at a time, only the cell of user 0, which has the earliest finishing time, is removed from the element pool 24. The remaining users have their positions moved up one notch in regard to their finish time since now time T=3000 for the cell of user 1 is the earliest finishing time and the time T=6000 for the cell associated with user 2 is now the second latest finishing time. Also, as is apparent from the example, since all the cells of user 0, 1 and 2 have arrived at the same starting time in the element pool 24, even though their weights may be different, they are ordered in the starting time priority queue 16 on the basis of highest user number to lowest user number, although essentially any scheme of ordering could be chosen.

At time T=2 and the virtual time now equal to 1000 (since the server 14 has just operated on a cell, the virtual time is increased by one unit of virtual time —here 1000) new cells from user 1, user 2 and user 3 arrive at the element pool 24. User 0 has a start time of T=2000 since that is the time identified with its arrival in the start time priority queue 16. It has a position of 1 in the finish time priority queue 18 because its finish time T=4000 is second earliest of the cells in the finish time. In addition, the quantities of user 1 and user 2 are now both 2 since each of these users also have additional cells in the element pool 24 at time T=2. Since user 1 has the earliest finishing time of 3000 of all the cells in the element pool 24, and it also has a start time of T=0 which is earlier than the time V=1000 and is thus present in the element pool 24, then it is this cell which is the cell in the element pool 24 which is provided to the server 14 to be operated upon by the server 14. Thus, in the next operation of the server 14, the server 14 serves the cell of user 1 that has the finishing time of T=3000. This cell is removed from the element pool 24, and the starting time priority queue 16 and finish time priority queue 18 are thus adjusted. The quantity of cells for user 1 is now reduced to 1 while the quantity of cells for user 0 remains 1 and the quantity of cells for user 2 remains 2. Since there is a remaining cell still in the element pool 24 for user 1, its presence becomes apparent in the start time column with a time T=3000 and a finish time of T=6000 in the finish time column.

At time T=3, V=2000 since a cell was operated upon by this server 14 causing the virtual time of V=1000 to be incremented by one unit of time. At time T=3 and V=2000, only one new cell arrives. This new cell is from user 0. This is reflected by the quantity of cells in the element pool 24 being 2 for the user 0. At this time, user 0 has a cell in the finishing time priority queue 18 of T=4000, which is the earliest finishing time. Since this cell also has a start time of T=2000, it is present in the element pool 24 at time V=2000 and it is the cell to be operated upon by the server 14. When the server operates at T=3 and virtual time equal to 2000, the cell of user 0 having finishing time T=4000 is removed from the element pool 24 and is operated upon by the server 14. The quantity of cells associated with user 0 in the element pool 24 is then reduced by 1.

At this point, all the finishing times of all the cells of the users are T=6000. Thus, in regard to the finishing times all being equal, the start times then become controlling in terms of which cell is operated upon next by the server. This can be seen at time T=4 and V=3000 where user 2 has two cells in the element pool 24 with the earliest one having a start time T=0. It is this cell of user 2 that is then operated upon by the server 14. The remainder of the examples should be understood based on the explanation above.

Figure 21:
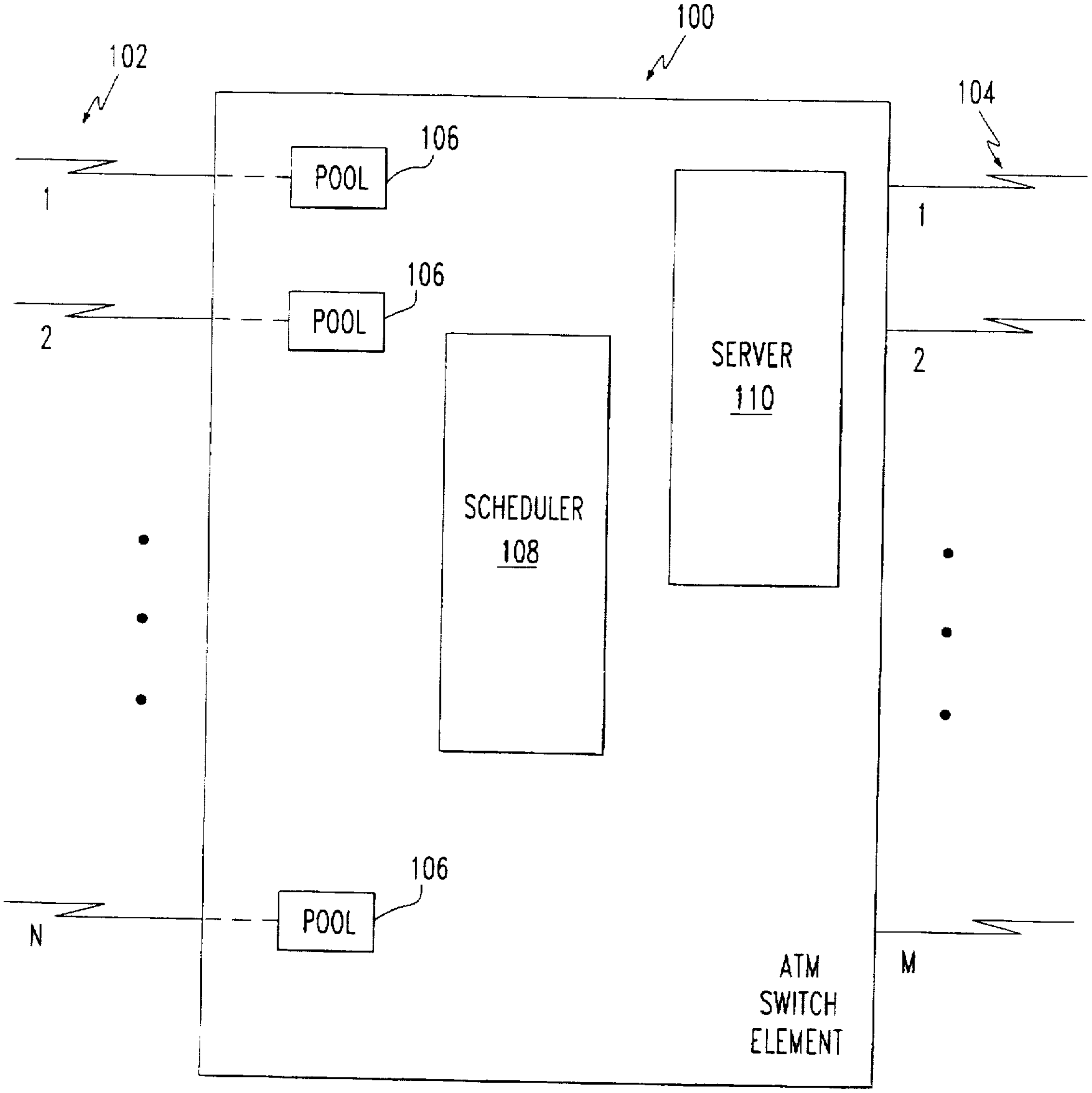
FIG. 21 is a schematic representation of an ATM switch element.

In a specific application of the invention, an ATM switch element has one to N input connections 102 and one to M output connections 104, as shown in FIG. 21. ATM cells are received by the switch element 100 through the input connections 102. The switch element 100 operates on the cells and sends them on their way through output connections 104. Whenever a cell comes in over a specific input connection 102, it is placed in a pool 106, as is well known in the art, and informs the scheduler 108 of the switch element, as is well known in the art, of the presence of the cell in the corresponding pool 106. It should be noted that each input connection 102 can have its own unique pool 106 in which cells entering the switch element 102 are stored or there can be a common pool 106 in which all cells from each individual input connection 102 are stored until the server 110 of the switch element is ready to operate upon them.

The scheduler 108 of the switch element 100 operates as described above except in the ATM context, the finish time is determined by the finish time identified in the scheduler for the cell as well as a bid value that has been provided by the cell in order to obtain service by the server 110 of the switch element 100. This use of a bid is well known in the art. See, for instance, "Gigabit Networking" by Craig Partridge, Addison Wesley, 1994; "ATM User Network Interface Specification, Version 3.0" by the ATM Forum, Prentice Hall, 1994; "Asynchronous Transfer Mode Networks: Performance Issues", by Raif O. Onvural, Artech House, Inc., Norwood, Mass. 1994, all of which are incorporated by reference.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX please print the App.
7/18/98 M.P.

- 29 -

VSQ_27

```
./vsq_m alg = 0, time = 20, mark = 0, inc - 1
con #        W        R        AW
  0       0.500000 0.500000 0.500000
  1       0.333333 0.333333 0.333333
  2       0.166667 0.166667 0.166667

T=        1
V=        0
ARRIVALS....
U000
U001
U002
       Start Time        | Finish Time          | Start Queue       | Finish Queue
USER#  (pos,        T)   | (pos,        T)    Q | (  0,          T) | (  0,        T)
  0    (  2,        0)   | (  0,     2000)    1 | (  2,          0) | (  0,     2000)
  1    (  1,        0)   | (  1,     3000)    1 | (  1,          0) | (  1,     3000)
  2    (  0,        0)   | (  2,     6000)    1 | (  0,          0) | (  2,     6000)

SERVING U000

       Start Time        | Finish Time          | Start Queue       | Finish Queue
USER#  (pos,        T)   | (pos,        T)    Q | (  0,          T) | (  0,        T)
  0    ( -1,        0)   | ( -1,     2000)    0 | (  2,          0) | (  1,     3000)
  1    (  1,        0)   | (  0,     3000)    1 | (  1,          0) | (  2,     6000)
  2    (  0,        0)   | (  1,     6000)    1 | ( -1,         -1) | ( -1,        1)

T=        2
V=     1000
ARRIVALS....
U000
U001
U002
       Start Time        | Finish Time          | Start Queue       | Finish Queue
USER#  (pos,        T)   | (pos,        T)    Q | (  0,          T) | (  0,        T)
  0    (  2,     2000)   | (  1,     4000)    1 | (  2,          0) | (  1,     3000)
  1    (  1,        0)   | (  0,     3000)    2 | (  1,          0) | (  0,     4000)
  2    (  0,        0)   | (  2,     6000)    2 | (  0,       2000) | (  2,     6000)

SERVING U001

       Start Time        | Finish Time          | Start Queue       | Finish Queue
USER#  (pos,        T)   | (pos,        T)    Q | (  0,          T) | (  0,        T)
  0    (  1,     2000)   | (  0,     4000)    1 | (  2,          0) | (  0,     4000)
  1    (  2,     3000)   | (  2,     6000)    1 | (  0,       2000) | (  2,     6000)
  2    (  0,        0)   | (  1,     6000)    2 | (  1,       3000) | (  1,     6000)

T=        3
V=     2000
ARRIVALS....
U000
       Start Time        | Finish Time          | Start Queue       | Finish Queue
USER#  (pos,        T)   | (pos,        T)    Q | (  0,          T) | (  0,        T)
  0    (  1,     2000)   | (  0,     4000)    2 | (  2,          0) | (  0,     4000)
  1    (  2,     3000)   | (  2,     6000)    1 | (  0,       2000) | (  2,     6000)
  2    (  0,        0)   | (  1,     6000)    2 | (  1,       3000) | (  1,     6000)

SERVING U000

       Start Time        | Finish Time          | Start Queue       | Finish Queue
USER#  (pos,        T)   | (pos,        T)    Q | (  0,          T) | (  0,        T)
  0    (  2,     4000)   | (  2,     6000)    1 | (  2,          0) | (  2,     6000)
  1    (  1,     3000)   | (  1,     6000)    1 | (  1,       3000) | (  1,     6000)
  2    (  0,        0)   | (  0,     6000)    2 | (  0,       4000) | (  0,     6000)

T=        4
V=     3000
ARRIVALS....
U001
       Start Time        | Finish Time          | Start Queue       | Finish Queue
USER#  (pos,        T)   | (pos,        T)    Q | (  0,          T) | (  0,        T)
  0    (  2,     4000)   | (  2,     6000)    1 | (  2,          0) | (  2,     6000)
  1    (  1,     3000)   | (  1,     6000)    2 | (  1,       3000) | (  1,     6000)
  2    (  0,        0)   | (  0,     6000)    2 | (  0,       4000) | (  0,     6000)

SERVING U002

       Start Time        | Finish Time          | Start Queue       | Finish Queue
USER#  (pos,        T)   | (pos,        T)    Q | (  0,          T) | (  0,        T)
  0    (  1,     4000)   | (  1,     6000)    1 | (  1,       3000) | (  1,     6000)
  1    (  0,     3000)   | (  0,     6000)    2 | (  0,       4000) | (  0,     6000)
  2    (  2,     6000)   | (  2,    12000)    1 | (  2,       6000) | (  2,    12000)

T=        5
V=     4000
ARRIVALS....
U000
       Start Time        | Finish Time          | Start Queue       | Finish Queue
USER#  (pos,        T)   | (pos,        T)    Q | (  0,          T) | (  0,        T)
  0    (  1,     4000)   | (  1,     6000)    2 | (  1,       3000) | (  1,     6000)
  1    (  0,     3000)   | (  0,     6000)    2 | (  0,       4000) | (  0,     6000)
  2    (  2,     6000)   | (  2,    12000)    1 | (  2,       6000) | (  2,    12000)

SERVING U001

       Start Time        | Finish Time          | Start Queue       | Finish Queue
USER#  (pos,        T)   | (pos,        T)    Q | (  0,          T) | (  0,        T)
  0    (  0,     4000)   | (  0,     6000)    2 | (  0,       4000) | (  0,     6000)
  1    (  2,     6000)   | (  1,     9000)    1 | (  2,       6000) | (  1,     9000)
  2    (  1,     6000)   | (  2,    12000)    1 | (  1,       6000) | (  2,    12000)

T=        6
V=     5000
ARRIVALS....
       Start Time        | Finish Time          | Start Queue       | Finish Queue
USER#  (pos,        T)   | (pos,        T)    Q | (  0,          T) | (  0,        T)
  0    (  0,     4000)   | (  0,     6000)    2 | (  0,       4000) | (  0,     6000)
  1    (  2,     6000)   | (  1,     9000)    1 | (  2,       6000) | (  1,     9000)
  2    (  1,     6000)   | (  2,    12000)    1 | (  1,       6000) | (  2,    12000)

SERVING U000

       Start Time        | Finish Time          | Start Queue       | Finish Queue
USER#  (pos,        T)   | (pos,        T)    Q | (  0,          T) | (  0,        T)
  0    (  2,     6000)   | (  0,     8000)    1 | (  2,       6000) | (  0,     8000)
  1    (  1,     6000)   | (  1,     9000)    1 | (  1,       6000) | (  1,     9000)
  2    (  0,     6000)   | (  2,    12000)    1 | (  0,       6000) | (  2,    12000)

T=        7
V=     6000
ARRIVALS....
U000
U001
U002
       Start Time        | Finish Time          | Start Queue       | Finish Queue
USER#  (pos,        T)   | (pos,        T)    Q | (  0,          T) | (  0,        T)
  0    (  2,     6000)   | (  0,     8000)    2 | (  2,       6000) | (  0,     8000)
  1    (  1,     6000)   | (  1,     9000)    2 | (  1,       6000) | (  1,     9000)
  2    (  0,     6000)   | (  2,    12000)    2 | (  0,       6000) | (  2,    12000)
```

- 30 -

VSQ_27

```
SERVING U000

      Start Time        | Finish Time           | Start Queue      | Finish Queue
USER# (pos,        T)   | (pos,        T)     Q | (  0,       T)   | (  0,       T)
  0   (  2,     8000)   | (  1,    10000)     1 | (  2,    6000)   | (  1,    9000)
  1   (  1,     6000)   | (  0,     9000)     2 | (  1,    6000)   | (  0,   10000)
  2   (  0,     6000)   | (  2,    12000)     2 | (  0,    8000)   | (  2,   12000)

T=        8
V=     7000
ARRIVALS....
      Start Time        | Finish Time           | Start Queue      | Finish Queue
USER# (pos,        T)   | (pos,        T)     Q | (  0,       T)   | (  0,       T)
  0   (  2,     8000)   | (  1,    10000)     1 | (  2,    6000)   | (  1,    9000)
  1   (  1,     6000)   | (  0,     9000)     2 | (  1,    6000)   | (  0,   10000)
  2   (  0,     6000)   | (  2,    12000)     2 | (  0,    8000)   | (  2,   12000)

SERVING U001

      Start Time        | Finish Time           | Start Queue      | Finish Queue
USER# (pos,        T)   | (pos,        T)     Q | (  0,       T)   | (  0,       T)
  0   (  1,     8000)   | (  0,    10000)     1 | (  2,    6000)   | (  0,   10000)
  1   (  2,     9000)   | (  2,    12000)     1 | (  0,    8000)   | (  2,   12000)
  2   (  0,     6000)   | (  1,    12000)     2 | (  1,    9000)   | (  1,   12000)

T=        9
V=     8000
ARRIVALS....
U000
      Start Time        | Finish Time           | Start Queue      | Finish Queue
USER# (pos,        T)   | (pos,        T)     Q | (  0,       T)   | (  0,       T)
  0   (  1,     8000)   | (  0,    10000)     2 | (  2,    6000)   | (  0,   10000)
  1   (  2,     9000)   | (  2,    12000)     1 | (  0,    8000)   | (  2,   12000)
  2   (  0,     6000)   | (  1,    12000)     2 | (  1,    9000)   | (  1,   12000)

SERVING U000

      Start Time        | Finish Time           | Start Queue      | Finish Queue
USER# (pos,        T)   | (pos,        T)     Q | (  0,       T)   | (  0,       T)
  0   (  2,    10000)   | (  2,    12000)     1 | (  2,    6000)   | (  2,   12000)
  1   (  1,     9000)   | (  1,    12000)     1 | (  1,    9000)   | (  1,   12000)
  2   (  0,     6000)   | (  0,    12000)     2 | (  0,   10000)   | (  0,   12000)

T=       10
V=     9000
ARRIVALS....
U001
      Start Time        | Finish Time           | Start Queue      | Finish Queue
USER# (pos,        T)   | (pos,        T)     Q | (  0,       T)   | (  0,       T)
  0   (  2,    10000)   | (  2,    12000)     1 | (  2,    6000)   | (  2,   12000)
  1   (  1,     9000)   | (  1,    12000)     2 | (  1,    9000)   | (  1,   12000)
  2   (  0,     6000)   | (  0,    12000)     2 | (  0,   10000)   | (  0,   12000)

SERVING U002

      Start Time        | Finish Time           | Start Queue      | Finish Queue
USER# (pos,        T)   | (pos,        T)     Q | (  0,       T)   | (  0,       T)
  0   (  1,    10000)   | (  1,    12000)     1 | (  1,    9000)   | (  1,   12000)
  1   (  0,     9000)   | (  0,    12000)     2 | (  0,   10000)   | (  0,   12000)
  2   (  2,    12000)   | (  2,    18000)     1 | (  2,   12000)   | (  2,   18000)

T=       11
V=    10000
ARRIVALS....
U000
      Start Time        | Finish Time           | Start Queue      | Finish Queue
USER# (pos,        T)   | (pos,        T)     Q | (  0,       T)   | (  0,       T)
  0   (  1,    10000)   | (  1,    12000)     2 | (  1,    9000)   | (  1,   12000)
  1   (  0,     9000)   | (  0,    12000)     2 | (  0,   10000)   | (  0,   12000)
  2   (  2,    12000)   | (  2,    18000)     1 | (  2,   12000)   | (  2,   18000)

SERVING U001

      Start Time        | Finish Time           | Start Queue      | Finish Queue
USER# (pos,        T)   | (pos,        T)     Q | (  0,       T)   | (  0,       T)
  0   (  0,    10000)   | (  0,    12000)     2 | (  0,   10000)   | (  0,   12000)
  1   (  2,    12000)   | (  1,    15000)     1 | (  2,   12000)   | (  1,   15000)
  2   (  1,    12000)   | (  2,    18000)     1 | (  1,   12000)   | (  2,   18000)

T=       12
V=    11000
ARRIVALS....
      Start Time        | Finish Time           | Start Queue      | Finish Queue
USER# (pos,        T)   | (pos,        T)     Q | (  0,       T)   | (  0,       T)
  0   (  0,    10000)   | (  0,    12000)     2 | (  0,   10000)   | (  0,   12000)
  1   (  2,    12000)   | (  1,    15000)     1 | (  2,   12000)   | (  1,   15000)
  2   (  1,    12000)   | (  2,    18000)     1 | (  1,   12000)   | (  2,   18000)

SERVING U000

      Start Time        | Finish Time           | Start Queue      | Finish Queue
USER# (pos,        T)   | (pos,        T)     Q | (  0,       T)   | (  0,       T)
  0   (  2,    12000)   | (  0,    14000)     1 | (  2,   12000)   | (  0,   14000)
  1   (  1,    12000)   | (  1,    15000)     1 | (  1,   12000)   | (  1,   15000)
  2   (  0,    12000)   | (  2,    18000)     1 | (  0,   12000)   | (  2,   18000)

T=       13
V=    12000
ARRIVALS....
U000
U001
U002
      Start Time        | Finish Time           | Start Queue      | Finish Queue
USER# (pos,        T)   | (pos,        T)     Q | (  0,       T)   | (  0,       T)
  0   (  2,    12000)   | (  0,    14000)     2 | (  2,   12000)   | (  0,   14000)
  1   (  1,    12000)   | (  1,    15000)     2 | (  1,   12000)   | (  1,   15000)
  2   (  0,    12000)   | (  2,    18000)     2 | (  0,   12000)   | (  2,   18000)

SERVING U000

      Start Time        | Finish Time           | Start Queue      | Finish Queue
USER# (pos,        T)   | (pos,        T)     Q | (  0,       T)   | (  0,       T)
  0   (  2,    14000)   | (  1,    16000)     1 | (  2,   12000)   | (  1,   15000)
  1   (  1,    12000)   | (  0,    15000)     2 | (  1,   12000)   | (  0,   16000)
  2   (  0,    12000)   | (  2,    18000)     2 | (  0,   14000)   | (  2,   18000)

T=       [illegible]
V=    [illegible]
ARRIVALS....
      Start Time        | Finish Time           | Start Queue      | Finish Queue
USER# (pos,        T)   | (pos,        T)     Q | (  0,       T)   | (  0,       T)
  0   (  2,    14000)   | (  1,    16000)     1 | (  2,   12000)   | (  1,   15000)
  1   (  1,    12000)   | (  0,    15000)     2 | (  1,   12000)   | (  0,   16000)
  2   (  0,    12000)   | (  2,    18000)     2 | (  0,   14000)   | (  2,   18000)

SERVING U001
```

- 31 -

VSQ_27

```
      Start Time        | Finish Time              | Start Queue      |   Finish Queue
USER# (pos,          T) | (pos,          T)     Q  | (  U,         T) | (  U,         T)
  0   (  1,      14000) | (  0,      16000)     1  | (  2,     12000) | (  0,     16000)
  1   (  2,      15000) | (  2,      18000)     1  | (  0,     14000) | (  2,     18000)
  2   (  0,      12000) | (  1,      18000)     2  | (  1,     15000) | (  1,     18000)

T=        15
V=     14000
ARRIVALS....
U000
      Start Time        | Finish Time              | Start Queue      |   Finish Queue
USER# (pos,          T) | (pos,          T)     Q  | (  U,         T) | (  U,         T)
  0   (  1,      14000) | (  0,      16000)     2  | (  2,     12000) | (  0,     16000)
  1   (  2,      15000) | (  2,      18000)     1  | (  0,     14000) | (  2,     18000)
  2   (  0,      12000) | (  1,      18000)     2  | (  1,     15000) | (  1,     18000)

SERVING U000

      Start Time        | Finish Time              | Start Queue      |   Finish Queue
USER# (pos,          T) | (pos,          T)     Q  | (  U,         T) | (  U,         T)
  0   (  2,      16000) | (  2,      18000)     1  | (  2,     12000) | (  2,     18000)
  1   (  1,      15000) | (  1,      18000)     1  | (  1,     15000) | (  1,     18000)
  2   (  0,      12000) | (  0,      18000)     2  | (  0,     16000) | (  0,     18000)

T=        16
V=     15000
ARRIVALS ...
U001
      Start Time        | Finish Time              | Start Queue      |   Finish Queue
USER# (pos,          T) | (pos,          T)     Q  | (  U,         T) | (  U,         T)
  0   (  2,      16000) | (  2,      18000)     1  | (  2,     12000) | (  2,     18000)
  1   (  1,      15000) | (  1,      18000)     2  | (  1,     15000) | (  1,     18000)
  2   (  0,      12000) | (  0,      18000)     2  | (  0,     16000) | (  0,     18000)

SERVING U002

      Start Time        | Finish Time              | Start Queue      |   Finish Queue
USER# (pos,          T) | (pos,          T)     Q  | (  U,         T) | (  U,         T)
  0   (  1,      16000) | (  1,      18000)     1  | (  1,     15000) | (  1,     18000)
  1   (  0,      15000) | (  0,      18000)     2  | (  0,     16000) | (  0,     18000)
  2   (  2,      18000) | (  2,      24000)     1  | (  2,     18000) | (  2,     24000)

T=        17
V=     16000
ARRIVALS....
U000
      Start Time        | Finish Time              | Start Queue      |   Finish Queue
USER# (pos,          T) | (pos,          T)     Q  | (  U,         T) | (  U,         T)
  0   (  1,      16000) | (  1,      18000)     2  | (  1,     15000) | (  1,     18000)
  1   (  0,      15000) | (  0,      18000)     2  | (  0,     16000) | (  0,     18000)
  2   (  2,      18000) | (  2,      24000)     1  | (  2,     18000) | (  2,     24000)

SERVING U001

      Start Time        | Finish Time              | Start Queue      |   Finish Queue
USER# (pos,          T) | (pos,          T)     Q  | (  U,         T) | (  U,         T)
  0   (  0,      16000) | (  0,      18000)     2  | (  0,     16000) | (  0,     18000)
  1   (  2,      18000) | (  1,      21000)     1  | (  2,     18000) | (  1,     21000)
  2   (  1,      18000) | (  2,      24000)     1  | (  1,     18000) | (  2,     24000)

T=        18
V=     17000
ARRIVALS....
      Start Time        | Finish Time              | Start Queue      |   Finish Queue
USER# (pos,          T) | (pos,          T)     Q  | (  U,         T) | (  U,         T)
  0   (  0,      16000) | (  0,      18000)     2  | (  0,     16000) | (  0,     18000)
  1   (  2,      18000) | (  1,      21000)     1  | (  2,     18000) | (  1,     21000)
  2   (  1,      18000) | (  2,      24000)     1  | (  1,     18000) | (  2,     24000)

SERVING U000

      Start Time        | Finish Time              | Start Queue      |   Finish Queue
USER# (pos,          T) | (pos,          T)     Q  | (  U,         T) | (  U,         T)
  0   (  2,      18000) | (  0,      20000)     1  | (  2,     18000) | (  0,     20000)
  1   (  1,      18000) | (  1,      21000)     1  | (  1,     18000) | (  1,     21000)
  2   (  0,      18000) | (  2,      24000)     1  | (  0,     16000) | (  2,     24000)

T=        19
V=     18000
ARRIVALS....
U000
U001
U002
      Start Time        | Finish Time              | Start Queue      |   Finish Queue
USER# (pos,          T) | (pos,          T)     Q  | (  U,         T) | (  U,         T)
  0   (  2,      18000) | (  0,      20000)     2  | (  2,     18000) | (  0,     20000)
  1   (  1,      18000) | (  1,      21000)     2  | (  1,     18000) | (  1,     21000)
  2   (  0,      18000) | (  2,      24000)     2  | (  0,     18000) | (  2,     24000)

SERVING U000

      Start Time        | Finish Time              | Start Queue      |   Finish Queue
USER# (pos,          T) | (pos,          T)     Q  | (  U,         T) | (  U,         T)
  0   (  2,      20000) | (  1,      22000)     1  | (  2,     18000) | (  1,     21000)
  1   (  1,      18000) | (  0,      21000)     2  | (  1,     18000) | (  0,     20000)
  2   (  0,      18000) | (  2,      24000)     2  | (  0,     20000) | (  2,     24000)
0          70 1666673400000004
W = Weight, R = Rate
Max E - Max Early, Max L = Max Late. (both in units of that users service time
con #         W        R          should send   did send    Max E    Max L
  0        0.500000 0.500000          10           10      0.500000 0.000000
  1        0.333333 0.333333           6            6      0.333334 0.000000
  2        0.166667 0.166667           3            3      0.333333 0.000000
AW = Achievable Rate, RR = Realized Rate, AB = Average Buffer Size
con #         W        R        AR       RR       AB
  0        0.500000 0.500000 0.500000 0.500000 1.000000
  1        0.333333 0.333333 0.333333 0.300000 1.150000
  2        0.166667 0.166667 0.166667 0.150000 1.300000
```

- 32 -

VSQ_26

```
../../vsq m alg = 0, time = 20, mark = 0, inc = 1
con #        W        R        AW
  0      0.500000 0.500000 0.500000
  1      0.333300 0.333300 0.333300
  2      0.166660 0.166660 0.166660

T=        1
V=        0
ARRIVALS....
       Start Time       | Finish Time          | Start Queue      | Finish Queue
USER#  (pos,       T)   | (pos,       T)     Q | (  0,       T)   | (  0,      T)
  0    ( -1,       0)   | ( -1,       0)     0 | ( -1,      -1)   | ( -1,     -1)
  1    ( -1,       0)   | ( -1,       0)     0 | ( -1,      -1)   | ( -1,     -1)
  2    ( -1,       0)   | ( -1,       0)     0 | ( -1,      -1)   | ( -1,     -1)
       Start Time       | Finish Time          | Start Queue      | Finish Queue
USER#  (pos,       T)   | (pos,       T)     Q | (  0,       T)   | (  0,      T)
  0    ( -1,       0)   | ( -1,       0)     0 | ( -1,      -1)   | ( -1,     -1)
  1    ( -1,       0)   | ( -1,       0)     0 | ( -1,      -1)   | ( -1,      1)
  2    ( -1,       0)   | ( -1,       0)     0 | ( -1,      -1)   | ( -1,     -1)

T=        2
V=        0
ARRIVALS....
       Start Time       | Finish Time          | Start Queue      | Finish Queue
USER#  (pos,       T)   | (pos,       T)     Q | (  0,       T)   | (  0,      T)
  0    ( -1,       0)   | ( -1,       0)     0 | ( -1,      -1)   | ( -1,     -1)
  1    ( -1,       0)   | ( -1,       0)     0 | ( -1,      -1)   | ( -1,     -1)
  2    (  1,       0)   | ( -1,       0)     0 | ( -1,      -1)   | (  1,      1)
       Start Time       | Finish Time          | Start Queue      | Finish Queue
USER#  (pos,       T)   | (pos,       T)     Q | (  0,       T)   | (  0,      T)
  0    ( -1,       0)   | ( -1,       0)     0 | (  1,      -1)   | ( -1,     -1)
  1    ( -1,       0)   | ( -1,       0)     0 | ( -1,      -1)   | ( -1,      1)
  2    ( -1,       0)   | ( -1,       0)     0 | ( -1,      -1)   | ( -1,      1)

T=        3
V=        0
ARRIVALS....
U000
       Start Time       | Finish Time          | Start Queue      | Finish Queue
USER#  (pos,       T)   | (pos,       T)     Q | (  0,       T)   | (  0,      T)
  0    (  0,       0)   | (  0,    2000)     1 | (  0,       0)   | (  0,   2000)
  1    ( -1,       0)   | ( -1,       0)     0 | ( -1,      -1)   | ( -1,      1)
  2    ( -1,       0)   | ( -1,       0)     0 | ( -1,       1)   | ( -1,     -1)

SERVING U000

       Start Time       | Finish Time          | Start Queue      | Finish Queue
USER#  (pos,       T)   | (pos,       T)     Q | (  0,       T)   | (  0,      T)
  0    (  1,       0)   | ( -1,    2000)     0 | (  1,      -1)   | ( -1,     -1)
  1    ( -1,       0)   | ( -1,       0)     0 | (  1,      -1)   | ( -1,     -1)
  2    ( -1,       0)   | ( -1,       0)     0 | ( -1,      -1)   | ( -1,      1)

T=        4
V=     3000
ARRIVALS....
U001
       Start Time       | Finish Time          | Start Queue      | Finish Queue
USER#  (pos,       T)   | (pos,       T)     Q | (  0,       T)   | (  0,      T)
  0    ( -1,       0)   | (  1,    2000)     0 | (  1,    3000)   | (  1,   6000)
  1    (  0,    3000)   | (  0,    6000)     1 | ( -1,      -1)   | ( -1,      1)
  2    ( -1,       0)   | ( -1,       0)     0 | ( -1,      -1)   | (  1,     -1)

SERVING U001

       Start Time       | Finish Time          | Start Queue      | Finish Queue
USER#  (pos,       T)   | (pos,       T)     Q | (  0,       T)   | (  0,      T)
  0    (  1,       0)   | (  1,    2000)     0 | ( -1,       1)   | ( -1,      1)
  1    ( -1,    3000)   | (  1,    6000)     0 | ( -1,      -1)   | (  1,      1)
  2    (  1,       0)   | (  1,       0)     0 | (  1,       1)   | (  1,      1)

T=        5
V=     7000
ARRIVALS....
U000
       Start Time       | Finish Time          | Start Queue      | Finish Queue
USER#  (pos,       T)   | (pos,       T)     Q | (  0,       T)   | (  0,      T)
  0    (  0,    7000)   | (  0,    9000)     1 | (  0,    7000)   | (  0,   9000)
  1    ( -1,    3000)   | (  1,    6000)     0 | (  1,       1)   | ( -1,      1)
  2    (  1,       0)   | (  1,       0)     0 | (  1,       1)   | (  1,      1)

SERVING U00[illegible]

       Start Time       | Finish Time          | Start Queue      | Finish Queue
USER#  (pos,       T)   | (pos,       T)     Q | (  0,       T)   | (  0,      T)
  0    (  1,    7000)   | ( -1,    9000)     0 | ( -1,      -1)   | ( -1,     -1)
  1    ( -1,    3000)   | (  1,    6000)     0 | ( -1,       1)   | (  1,      1)
  2    ( -1,       0)   | ( -1,       0)     0 | (  1,       1)   | (  1,      1)

T=        6
V=    10000
ARRIVALS....
       Start Time       | Finish Time          | Start Queue      | Finish Queue
USER#  (pos,       T)   | (pos,       T)     Q | (  0,       T)   | (  0,      T)
  0    ( -1,    7000)   | (  1,    9000)     0 | (  1,       1)   | (  1,      1)
  1    (  1,    3000)   | ( -1,    6000)     0 | (  1,       1)   | (  1,      1)
  2    (  1,       0)   | ( -1,       0)     0 | (  1,       1)   | ( -1,     -1)
       Start Time       | Finish Time          | Start Queue      | Finish Queue
USER#  (pos,       T)   | (pos,       T)     Q | (  0,       T)   | (  0,      T)
  0    ( -1,    7000)   | ( -1,    9000)     0 | (  1,       1)   | (  1,      1)
  1    ( -1,    3000)   | ( -1,    6000)     0 | (  1,       1)   | (  1,     -1)
  2    ( -1,       0)   | ( -1,       0)     0 | ( -1,       1)   | (  1,      1)

T=        7
V=    10000
ARRIVALS....
U000
U001
U002
       Start Time       | Finish Time          | Start Queue      | Finish Queue
USER#  (pos,       T)   | (pos,       T)     Q | (  0,       T)   | (  0,      T)
  0    (  2,   10000)   | (  0,   12000)     1 | (  2,   10000)   | (  0,  12000)
  1    (  1,   10000)   | (  1,   13000)     1 | (  1,   10000)   | (  1,  13000)
  2    (  0,   10000)   | (  2,   16000)     1 | (  0,   10000)   | (  2,  16000)

SERVING U000

       Start Time       | Finish Time          | Start Queue      | Finish Queue
USER#  (pos,       T)   | (pos,       T)     Q | (  0,       T)   | (  0,      T)
  0    ( -1,   10000)   | ( -1,   12000)     0 | (  2,   10000)   | (  1,  13000)
  1    (  1,   10000)   | (  0,   13000)     1 | (  1,   10000)   | (  2,  16000)
  2    (  0,   10000)   | (  1,   16000)     1 | ( -1,       1)   | ( -1,      1)

T=        8
V=    11000
ARRIVALS
       Start Time       | Finish Time          | Start Queue      | Finish Queue
USER#  (pos,       T)   | (pos,       T)     Q | (  0,       T)   | (  0,      T)
  0    (  1,   10000)   | (  1,   12000)     0 | (  2,   10000)   | (  1,  13000)
```

VSQ_26

```
  1    ( 1,     10000) | ( 0,     13000)         1 | ( 1,     10000) | ( 2,     16000)
  2    ( 0,     10000) | ( 1,     16000)         1 | (-1,        -1) | (-1,        -1)

SERVING U001

       Start Time      | Finish Time             | Start Queue      | Finish Queue
USER# (pos,         T) | (pos,          T)     Q | ( U,          T) | ( U,          T)
  0    (-1,     10000) | (-1,     12000)         0 | ( 2,     10000) | ( 2,     16000)
  1    (-1,     10000) | (-1,     13000)         0 | (-1,        -1) | (-1,        -1)
  2    ( 0,     10000) | ( 0,     16000)         1 | (-1,        -1) | (-1,        -1)

T=        9
V=    12000
ARRIVALS....
U000
       Start Time      | Finish Time             | Start Queue      | Finish Queue
USER# (pos,         T) | (pos,          T)     Q | ( U,          T) | ( U,          T)
  0    ( 1,     12000) | ( 0,     14000)         1 | ( 2,     10000) | ( 0,     14000)
  1    (-1,     10000) | (-1,     13000)         0 | ( 0,     12000) | ( 2,     16000)
  2    ( 0,     10000) | ( 1,     16000)         1 | (-1,        -1) | (-1,        -1)

SERVING U000

       Start Time      | Finish Time             | Start Queue      | Finish Queue
USER# (pos,         T) | (pos,          T)     Q | ( U,          T) | ( U,          T)
  0    (-1,     12000) | (-1,     14000)         0 | ( 2,     10000) | ( 2,     16000)
  1    (-1,     10000) | (-1,     13000)         0 | (-1,        -1) | (-1,        -1)
  2    ( 0,     10000) | ( 0,     16000)         1 | (-1,        -1) | ( 1,        -1)

T=       10
V=    13000
ARRIVALS....
U001
       Start Time      | Finish Time             | Start Queue      | Finish Queue
USER# (pos,         T) | (pos,          T)     Q | ( U,          T) | ( U,          T)
  0    (-1,     12000) | (-1,     14000)         0 | ( 2,     10000) | ( 2,     16000)
  1    ( 1,     13000) | ( 1,     16000)         1 | ( 1,     13000) | ( 1,     16000)
  2    ( 0,     10000) | ( 0,     16000)         1 | (-1,        -1) | (-1,        -1)

SERVING U002

       Start Time      | Finish Time             | Start Queue      | Finish Queue
USER# (pos,         T) | (pos,          T)     Q | ( U,          T) | ( U,          T)
  0    (-1,     12000) | (-1,     14000)         0 | ( 1,     13000) | ( 1,     16000)
  1    ( 0,     13000) | ( 0,     16000)         1 | (-1,        -1) | (-1,        -1)
  2    (-1,     10000) | (-1,     16000)         0 | (-1,        -1) | (-1,        -1)

T=       11
V=    14000
ARRIVALS....
U000
       Start Time      | Finish Time             | Start Queue      | Finish Queue
USER# (pos,         T) | (pos,          T)     Q | ( U,          T) | ( U,          T)
  0    ( 1,     14000) | ( 1,     16000)         1 | ( 1,     13000) | ( 1,     16000)
  1    ( 0,     13000) | ( 0,     16000)         1 | ( 0,     14000) | ( 0,     16000)
  2    (-1,     10000) | (-1,     16000)         0 | (-1,        -1) | (-1,        -1)

SERVING U001

       Start Time      | Finish Time             | Start Queue      | Finish Queue
USER# (pos,         T) | (pos,          T)     Q | ( U,          T) | ( U,          T)
  0    ( 0,     14000) | ( 0,     16000)         1 | ( 0,     14000) | ( 0,     16000)
  1    (-1,     13000) | ( 1,     16000)         0 | (-1,        -1) | (-1,        -1)
  2    (-1,     10000) | (-1,     16000)         0 | (-1,        -1) | (-1,        -1)

T=       12
V=    15000
ARRIVALS....
       Start Time      | Finish Time             | Start Queue      | Finish Queue
USER# (pos,         T) | (pos,          T)     Q | ( U,          T) | ( U,          T)
  0    ( 0,     14000) | ( 0,     16000)         1 | ( 0,     14000) | ( 0,     16000)
  1    (-1,     13000) | (-1,     16000)         0 | ( 1,         1) | (-1,         1)
  2    (-1,     10000) | ( 1,     16000)         0 | (-1,        -1) | ( 1,         1)

SERVING U000

       Start Time      | Finish Time             | Start Queue      | Finish Queue
USER# (pos,         T) | (pos,          T)     Q | ( U,          T) | ( U,          T)
  0    ( 1,     14000) | ( 1,     16000)         0 | ( 1,        -1) | ( 1,         1)
  1    ( 1,     13000) | ( 1,     16000)         0 | ( 1,        -1) | ( 1,        -1)
  2    ( 1,     10000) | ( 1,     16000)         0 | ( 1,        -1) | ( 1,         1)

T=       13
V=    17000
ARRIVALS....
U000
U001
U002
       Start Time      | Finish Time             | Start Queue      | Finish Queue
USER# (pos,         T) | (pos,          T)     Q | ( U,          T) | ( U,          T)
  0    ( 2,     17000) | ( 0,     19000)         1 | ( 2,     17000) | ( 0,     19000)
  1    ( 1,     17000) | ( 1,     20000)         1 | ( 1,     17000) | ( 1,     20000)
  2    ( 0,     17000) | ( 2,     23000)         1 | ( 0,     17000) | ( 2,     23000)

SERVING U000

       Start Time      | Finish Time             | Start Queue      | Finish Queue
USER# (pos,         T) | (pos,          T)     Q | ( U,          T) | ( U,          T)
  0    ( 1,     17000) | ( 1,     19000)         0 | ( 2,     17000) | ( 1,     20000)
  1    ( 1,     17000) | ( 0,     20000)         1 | ( 1,     17000) | ( 2,     23000)
  2    ( 0,     17000) | ( 1,     23000)         1 | ( 1,        -1) | (-1,         1)

T=       14
V=    18000
ARRIVALS....
       Start Time      | Finish Time             | Start Queue      | Finish Queue
USER# (pos,         T) | (pos,          T)     Q | ( U,          T) | ( U,          T)
  0    ( 1,     17000) | (-1,     19000)         0 | ( 2,     17000) | ( 1,     20000)
  1    ( 1,     17000) | ( 0,     20000)         1 | ( 1,     17000) | ( 2,     23000)
  2    ( 0,     17000) | ( 1,     23000)         1 | (-1,        -1) | (-1,         1)

SERVING U002

       Start Time      | Finish Time             | Start Queue      | Finish Queue
USER# (pos,         T) | (pos,          T)     Q | ( U,          T) | ( U,          T)
  0    ( 1,     17000) | ( 1,     19000)         0 | ( 2,     17000) | ( 2,     23000)
  1    ( 1,     17000) | ( 1,     20000)         0 | (-1,        -1) | ( 1,        -1)
  2    ( 0,     17000) | ( 0,     23000)         1 | (-1,         1) | (-1,         1)

T=       15
V=    19000
ARRIVALS....
U000
       Start Time      | Finish Time             | Start Queue      | Finish Queue
USER# (pos,         T) | (pos,          T)     Q | ( U,          T) | ( U,          T)
  0    ( 1,     19000) | ( 0,     21000)         1 | ( 2,     17000) | ( 0,     21000)
  1    (-1,     17000) | (-1,     20000)         0 | ( 0,     19000) | ( 2,     23000)
  2    ( 0,     17000) | ( 1,     23000)         1 | (-1,        -1) | ( 1,        -1)
```

```
SERVING U000

      Start Time          | Finish Time               |  Start Queue       |  Finish Queue
USER# (pos,           T)  | (pos,           T)      Q | (  0,          T)  | (  0,          T)
  0   ( -1,       19000)  | ( -1,       21000)      3 | (  2,      17000)  | (  2,      23000)
  1   ( -1,       17000)  | ( -1,       20000)      0 | ( -1,         -1)  | ( -1,         -1)
  2   (  0,       17000)  | (  0,       23000)      1 | ( -1,          1)  | ( -1,          1)

T=        16
V-     20000
ARRIVALS....
U001
      Start Time          | Finish Time               |  Start Queue       |  Finish Queue
USER# (pos,           T)  | (pos,           T)      Q | (  0,          T)  | (  0,          T)
  0   ( -1,       19000)  | ( -1,       21000)      0 | (  2,      17000)  | (  2,      23000)
  1   (  1,       20000)  | (  1,       23000)      1 | (  1,      20000)  | (  1,      23000)
  2   (  0,       17000)  | (  0,       23000)      1 | ( -1,         -1)  | (  1,         -1)

SERVING U002

      Start Time          | Finish Time               |  Start Queue       |  Finish Queue
USER# (pos,           T)  | (pos,           T)      Q | (  0,          T)  | (  0,          T)
  0   ( -1,       19000)  | ( -1,       21000)      0 | (  1,      20000)  | (  1,      23000)
  1   (  0,       20000)  | (  0,       23000)      1 | ( -1,         -1)  | ( -1,         -1)
  2   ( -1,       17000)  | ( -1,       23000)      0 | ( -1,         -1)  | ( -1,         -1)

T=        17
V-     21000
ARRIVALS....
U000
      Start Time          | Finish Time               |  Start Queue       |  Finish Queue
USER# (pos,           T)  | (pos,           T)      Q | (  0,          T)  | (  0,          T)
  0   (  1,       21000)  | (  1,       23000)      1 | (  1,      20000)  | (  1,      23000)
  1   (  0,       20000)  | (  0,       23000)      1 | (  0,      21000)  | (  0,      23000)
  2   ( -1,       17000)  | ( -1,       23000)      0 | ( -1,         -1)  | ( -1,         -1)

SERVING U001

      Start Time          | Finish Time               |  Start Queue       |  Finish Queue
USER# (pos,           T)  | (pos,           T)      Q | (  0,          T)  | (  0,          T)
  0   (  0,       21000)  | (  0,       23000)      1 | (  0,      21000)  | (  0,      23000)
  1   ( -1,       20000)  | (  1,       23000)      0 | ( -1,         -1)  | (  1,         -1)
  2   ( -1,       17000)  | (  1,       23000)      0 | ( -1,         -1)  | ( -1,         -1)

T=        18
V=     22000
ARRIVALS....
      Start Time          | Finish Time               |  Start Queue       |  Finish Queue
USER# (pos,           T)  | (pos,           T)      Q | (  0,          T)  | (  0,          T)
  0   (  0,       21000)  | (  0,       23000)      1 | (  0,      21000)  | (  0,      23000)
  1   ( -1,       20000)  | ( -1,       23000)      0 | ( -1,         -1)  | ( -1,         -1)
  2   ( -1,       17000)  | ( -1,       23000)      0 | ( -1,          1)  | ( -1,         -1)

SERVING U000

      Start Time          | Finish Time               |  Start Queue       |  Finish Queue
USER# (pos,           T)  | (pos,           T)      Q | (  0,          T)  | (  0,          T)
  0   ( -1,       21000)  | (  1,       23000)      0 | (  1,         -1)  | (  1,         -1)
  1   ( -1,       20000)  | ( -1,       23000)      0 | ( -1,          1)  | ( -1,          1)
  2   ( -1,       17000)  | ( -1,       23000)      0 | ( -1,         -1)  | ( -1,          1)

T=        19
V=     24000
ARRIVALS ....
U000
U001
U002
      Start Time          | Finish Time               |  Start Queue       |  Finish Queue
USER# (pos,           T)  | (pos,           T)      Q | (  0,          T)  | (  0,          T)
  0   (  2,       24000)  | (  0,       26000)      1 | (  2,      24000)  | (  0,      26000)
  1   (  1,       24000)  | (  1,       27000)      1 | (  1,      24000)  | (  1,      27000)
  2   (  0,       24000)  | (  2,       30000)      1 | (  0,      24000)  | (  2,      30000)

SERVING U000

      Start Time          | Finish Time               |  Start Queue       |  Finish Queue
USER# (pos,           T)  | (pos,           T)      Q | (  0,          T)  | (  0,          T)
  0   ( -1,       24000)  | (  1,       26000)      0 | (  2,      24000)  | (  1,      27000)
  1   (  1,       24000)  | (  0,       27000)      1 | (  1,      24000)  | (  2,      30000)
  2   (  0,       24000)  | (  1,       30000)      1 | ( -1,          1)  | (  1,          1)
S          14 33259999959998
W - Weight, R - Rate
Max E - Max Early, Max L - Max Late, (both in units of that users service time
con #          W        R            should send   did send     Max E    Max L
  0            0.500000 0.500000          10           9      0.000000 1.000000
  1            0.333300 0.333300           6           5      0.000000 0.666400
  2            0.166660 0.166660           3           2      0.000000 0.666600
AW - Achievable Rate, RR = Realized Rate, AB = Average Buffer Size
con #          W        R        AR       RR       AB
  0            0.500000 0.500000 0.500000 0.450000 0.100000
  1            0.333300 0.333300 0.333300 0.250000 0.200000
  2            0.166660 0.166660 0.166660 0.100000 0.400000
```

- 35 -

RCVSQ_05

```
../../rcvsq3 alg = 0, time = 10
con #          W          R          AW
  0         0.333300 0.400000 0.333300
  1         0.250000 0.300000 0.250000
  2         0.100000 0.100000 0.100000
  3         0.100000 0.100000 0.100000
  4         0.100000 0.100000 0.100000

T=          1
V=          0
ARRIVALS....
U000
U001
U002
U003
U004
       Start Time          | Finish Time                  | Start Queue        |  Finish Queue
USER# (pos,          T)    | (pos,          T)        Q   | (  U,         T)   | (  U,        T)
  0    (   4,        0)    | (   0,     30003)        1   | (   4,        0)   | (   0,    30003)
  1    (   3,        0)    | (   1,     40000)        1   | (   3,        0)   | (   1,    40000)
  2    (   2,        0)    | (   4,    100000)        1   | (   2,        0)   | (   4,   100000)
  3    (   1,        0)    | (   3,    100000)        1   | (   1,        0)   | (   3,   100000)
  4    (   0,        0)    | (   2,    100000)        1   | (   0,        0)   | (   2,   100000)

SERVING U000

       Start Time          | Finish Time                  | Start Queue        |  Finish Queue
USER# (pos,          T)    | (pos,          T)        Q   | (  U,         T)   | (  U,        T)
  0    (  -1,        0)    | (  -1,     30003)        0   | (   4,        0)   | (   1,    40000)
  1    (   3,        0)    | (   0,     40000)        1   | (   3,        0)   | (   4,   100000)
  2    (   2,        0)    | (   3,    100000)        1   | (   2,        0)   | (   3,   100000)
  3    (   1,        0)    | (   2,    100000)        1   | (   1,        0)   | (   2,   100000)
  4    (   0,        0)    | (   1,    100000)        1   | (   1,       -1)   | (  -1,        1)

T=          2
V=      10000
ARRIVALS....
       Start Time          | Finish Time                  | Start Queue        |  Finish Queue
USER# (pos,          T)    | (pos,          T)        Q   | (  U,         T)   | (  U,        T)
  0    (  -1,        0)    | (  -1,     30003)        0   | (   4,        0)   | (   1,    40000)
  1    (   3,        0)    | (   0,     40000)        1   | (   3,        0)   | (   4,   100000)
  2    (   2,        0)    | (   3,    100000)        1   | (   2,        0)   | (   3,   100000)
  3    (   1,        0)    | (   2,    100000)        1   | (   1,        0)   | (   2,   100000)
  4    (   0,        0)    | (   1,    100000)        1   | (  -1,       -1)   | (  -1,       -1)

SERVING U001

       Start Time          | Finish Time                  | Start Queue        |  Finish Queue
USER# (pos,          T)    | (pos,          T)        Q   | (  U,         T)   | (  U,        T)
  0    (  -1,        0)    | (  -1,     30003)        0   | (   4,        0)   | (   4,   100000)
  1    (  -1,        0)    | (  -1,     40000)        0   | (   3,        0)   | (   3,   100000)
  2    (   2,        0)    | (   2,    100000)        1   | (   2,        0)   | (   2,   100000)
  3    (   1,        0)    | (   1,    100000)        1   | (  -1,       -1)   | (  -1,       -1)
  4    (   0,        0)    | (   0,    100000)        1   | (  -1,       -1)   | (  -1,       -1)

T=          3
V=      20000
ARRIVALS ....
U000
       Start Time          | Finish Time                  | Start Queue        |  Finish Queue
USER# (pos,          T)    | (pos,          T)        Q   | (  U,         T)   | (  U,        T)
  0    (   3,    30003)    | (   0,     60006)        1   | (   4,        0)   | (   0,    60006)
  1    (   1,        0)    | (   1,     40000)        0   | (   3,        0)   | (   4,   100000)
  2    (   2,        0)    | (   3,    100000)        1   | (   2,        0)   | (   3,   100000)
  3    (   1,        0)    | (   2,    100000)        1   | (   0,    30003)   | (   2,   100000)
  4    (   0,        0)    | (   1,    100000)        1   | (  -1,       -1)   | (  -1,       -1)

SERVING U004

       Start Time          | Finish Time                  | Start Queue        |  Finish Queue
USER# (pos,          T)    | (pos,          T)        Q   | (  U,         T)   | (  U,        T)
  0    (   2,    30003)    | (   0,     60006)        1   | (   3,        0)   | (   0,    60006)
  1    (  -1,        0)    | (  -1,     40000)        0   | (   2,        0)   | (   3,   100000)
  2    (   1,        0)    | (   2,    100000)        1   | (   0,    30003)   | (   2,   100000)
  3    (   0,        0)    | (   1,    100000)        1   | (   1,       -1)   | (  -1,       -1)
  4    (   1,        0)    | (   1,    100000)        0   | (  -1,       -1)   | (   1,       -1)

T=          4
V=      30000
ARRIVALS....
U001
       Start Time          | Finish Time                  | Start Queue        |  Finish Queue
USER# (pos,          T)    | (pos,          T)        Q   | (  U,         T)   | (  U,        T)
  0    (   2,    30003)    | (   0,     60006)        1   | (   3,        0)   | (   0,    60006)
  1    (   3,    40000)    | (   1,     80000)        1   | (   2,        0)   | (   1,    80000)
  2    (   1,        0)    | (   3,    100000)        1   | (   0,    30003)   | (   3,   100000)
  3    (   0,        0)    | (   2,    100000)        1   | (   1,    40000)   | (   2,   100000)
  4    (  -1,        0)    | (   1,    100000)        0   | (  -1,       -1)   | (   1,       -1)

SERVING U003

       Start Time          | Finish Time                  | Start Queue        |  Finish Queue
USER# (pos,          T)    | (pos,          T)        Q   | (  U,         T)   | (  U,        T)
  0    (   1,    30003)    | (   0,     60006)        1   | (   2,        0)   | (   0,    60006)
  1    (   2,    40000)    | (   1,     80000)        1   | (   0,    30003)   | (   1,    80000)
  2    (   0,        0)    | (   2,    100000)        1   | (   1,    40000)   | (   2,   100000)
  3    (  -1,        0)    | (   1,    100000)        0   | (  -1,       -1)   | (   1,       -1)
  4    (   1,        0)    | (   1,    100000)        0   | (  -1,       -1)   | (   1,       -1)

T=          5
V=      40000
ARRIVALS....
       Start Time          | Finish Time                  | Start Queue        |  Finish Queue
USER# (pos,          T)    | (pos,          T)        Q   | (  U,         T)   | (  U,        T)
  0    (   1,    30003)    | (   0,     60006)        1   | (   2,        0)   | (   0,    60006)
  1    (   2,    40000)    | (   1,     80000)        1   | (   0,    30003)   | (   1,    80000)
  2    (   0,        0)    | (   2,    100000)        1   | (   1,    40000)   | (   2,   100000)
  3    (   1,        0)    | (  -1,    100000)        0   | (  -1,       -1)   | (  -1,       -1)
  4    (  -1,        0)    | (  -1,    100000)        0   | (   1,       -1)   | (   1,       -1)

SERVING U002

       Start Time          | Finish Time                  | Start Queue        |  Finish Queue
USER# (pos,          T)    | (pos,          T)        Q   | (  U,         T)   | (  U,        T)
  0    (   1,    30003)    | (   1,     60006)        0   | (   2,        0)   | (   1,    80000)
  1    (   1,    40000)    | (   0,     80000)        1   | (   1,    40000)   | (   2,   100000)
  2    (   0,        0)    | (   1,    100000)        1   | (  -1,       -1)   | (  -1,       -1)
  3    (  -1,        0)    | (   1,    100000)        0   | (  -1,       -1)   | (   1,       -1)
  4    (   1,        0)    | (  -1,    100000)        0   | (   1,       -1)   | (   1,       -1)

T=          6
V=      50000
ARRIVALS
U000
       Start Time          | Finish Time                  | Start Queue        |  Finish Queue
USER# (pos,          T)    | (pos,          T)        Q   | (  U,         T)   | (  U,        T)
  0    (   2,    60006)    | (   1,     90009)        1   | (   2,        0)   | (   1,    80000)
  1    (   1,    40000)    | (   0,     80000)        1   | (   1,    40000)   | (   0,    90009)
```

- 36 -

RCVSQ_05

```
  2   (  0,       0) | (  2,   100000)     1 | (  0,     60006) | (  2,   100000)
  3   ( -1,       0) | ( -1,   100000)     0 | ( -1,       -1) | (  1,       -1)
  4   (  1,       0) | ( -1,   100000)     0 | (  1,        1) | (  1,        1)

SERVING U001

       Start Time        | Finish Time          | Start Queue      | Finish Queue
USER# (pos,          T)  | (pos,          T)  Q | (  0,         T) | (  0,         T)
  0   (  1,      60006)  | (  0,      90009)  1 | (  2,         0) | (  0,     90009)
  1   (  1,      40000)  | ( -1,      80000)  0 | (  0,     60006) | (  2,    100000)
  2   (  0,          0)  | (  1,     100000)  1 | ( -1,         1) | ( -1,        -1)
  3   ( -1,          0)  | ( -1,     100000)  0 | (  1,        -1) | ( -1,         1)
  4   ( -1,          0)  | ( -1,     100000)  0 | ( -1,        -1) | ( -1,         1)

T=      7
V=  60000
ARRIVALS ...
U001
       Start Time        | Finish Time          | Start Queue      | Finish Queue
USER# (pos,          T)  | (pos,          T)  Q | (  0,         T) | (  0,         T)
  0   (  1,      60006)  | (  0,      90009)  1 | (  2,         0) | (  0,     90009)
  1   (  2,      80000)  | (  2,     120000)  1 | (  0,     60006) | (  2,    100000)
  2   (  0,          0)  | (  1,     100000)  1 | (  1,     80000) | (  1,    120000)
  3   ( -1,          0)  | (  1,     100000)  0 | ( -1,        -1) | ( -1,        -1)
  4   ( -1,          0)  | ( -1,     100000)  0 | ( -1,        -1) | ( -1,         1)

SERVING U002

       Start Time        | Finish Time          | Start Queue      | Finish Queue
USER# (pos,          T)  | (pos,          T)  Q | (  0,         T) | (  0,         T)
  0   (  0,      60006)  | (  0,      90009)  1 | (  0,     60006) | (  0,     90009)
  1   (  1,      80000)  | (  1,     120000)  1 | (  1,     80000) | (  1,    120000)
  2   ( -1,          0)  | (  1,     100000)  0 | ( -1,        -1) | ( -1,        -1)
  3   ( -1,          0)  | ( -1,     100000)  0 | ( -1,         1) | ( -1,        -1)
  4   ( -1,          0)  | ( -1,     100000)  0 | ( -1,         1) | ( -1,        -1)

T=      8
V=  70000
ARRIVALS. ..
       Start Time        | Finish Time          | Start Queue      | Finish Queue
USER# (pos,          T)  | (pos,          T)  Q | (  0,         T) | (  0,         T)
  0   (  0,      60006)  | (  0,      90009)  2 | (  0,     60006) | (  0,     90009)
  1   (  1,      80000)  | (  1,     120000)  1 | (  1,     80000) | (  1,    120000)
  2   (  1,          0)  | ( -1,     100000)  0 | ( -1,        -1) | ( -1,        -1)
  3   ( -1,          0)  | ( -1,     100000)  0 | (  1,        -1) | ( -1,        -1)
  4   ( -1,          0)  | ( -1,     100000)  0 | ( -1,        -1) | (  1,        -1)

SERVING U000

       Start Time        | Finish Time          | Start Queue      | Finish Queue
USER# (pos,          T)  | (pos,          T)  Q | (  0,         T) | (  0,         T)
  0   (  1,      90009)  | (  1,     120012)  1 | (  1,     80000) | (  1,    120000)
  1   (  0,      80000)  | (  0,     120000)  1 | (  0,     90009) | (  0,    120012)
  2   (  1,          0)  | ( -1,     100000)  0 | (  1,        -1) | (  1,         1)
  3   ( -1,          0)  | ( -1,     100000)  0 | (  1,        -1) | ( -1,        -1)
  4   ( -1,          0)  | ( -1,     100000)  0 | ( -1,        -1) | ( -1,        -1)

T=      9
V=  80000
ARRIVALS....
       Start Time        | Finish Time          | Start Queue      | Finish Queue
USER# (pos,          T)  | (pos,          T)  Q | (  0,         T) | (  0,         T)
  0   (  1,      90009)  | (  1,     120012)  1 | (  1,     80000) | (  1,    120000)
  1   (  0,      80000)  | (  0,     120000)  1 | (  0,     90009) | (  0,    120012)
  2   ( -1,          0)  | ( -1,     100000)  0 | (  1,         1) | ( -1,         1)
  3   ( -1,          0)  | (  1,     100000)  0 | (  1,        -1) | (  1,        -1)
  4   (  1,          0)  | (  1,     100000)  0 | (  1,         1) | ( -1,         1)

SERVING U001

       Start Time        | Finish Time          | Start Queue      | Finish Queue
USER# (pos,          T)  | (pos,          T)  Q | (  0,         T) | (  0,         T)
  0   (  0,      90009)  | (  0,     120012)  1 | (  0,     90009) | (  0,    120012)
  1   (  1,      80000)  | ( -1,     120000)  0 | (  1,         1) | ( -1,         1)
  2   (  1,          0)  | (  1,     100000)  0 | ( -1,        -1) | (  1,        -1)
  3   ( -1,          0)  | (  1,     100000)  0 | ( -1,        -1) | (  1,         1)
  4   ( -1,          0)  | ( -1,     100000)  0 | ( -1,        -1) | ( -1,        -1)
CON. #        W         R        should send    did send   Max E     Max I
  0       0.333306 0.400000          3              3      0.666700 0.000000
  1       0.250000 0.300000          2              3      0.750000 0.000000
  2       0.100000 0.100000          1              1      0.300000 0.100000
  3       0.100000 0.100000          1              1      0.600000 0.000000
  4       0.100000 0.100000          1              1      0.700000 0.000000
```

RCVSQ_1_05

```
/../rcvsq3 alg = 1, time = 10
con #          W        R        AU
  0         0.333300 0.400000 0.333300
  1         0.250000 0.300000 0.250000
  2         0.100000 0.100000 0.100000
  3         0.100000 0.100000 0.100000
  4         0.100000 0.100000 0.100000

T=          1
V=          0
ARRIVALS....
U000
U001
U002
U003
U004
        Start Time        | Finish Time          |   Start Queue       |   Finish Queue
USER#  (pos,          T)  | (pos,          T)  Q | (  U,          T)   | (  U,          T)
  0    (  0,      30003)  | (  0,      60006)  1 | (  0,      30003)   | (  0,      60006)
  1    (  1,      40000)  | (  1,      80000)  1 | (  1,      40000)   | (  1,      80000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

NOT SERVING ANY USER

T=          2
V=      10000
ARRIVALS.
        Start Time        | Finish Time          |   Start Queue       |   Finish Queue
USER#  (pos,          T)  | (pos,          T)  Q | (  U,          T)   | (  U,          T)
  0    (  0,      30003)  | (  0,      60006)  1 | (  0,      30003)   | (  0,      60006)
  1    (  1,      40000)  | (  1,      80000)  1 | (  1,      40000)   | (  1,      80000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

NOT SERVING ANY USER

T=          3
V=      20000
ARRIVALS....
        Start Time        | Finish Time          |   Start Queue       |   Finish Queue
USER#  (pos,          T)  | (pos,          T)  Q | (  U,          T)   | (  U,          T)
  0    (  0,      30003)  | (  0,      60006)  2 | (  0,      30003)   | (  0,      60006)
  1    (  1,      40000)  | (  1,      80000)  1 | (  1,      40000)   | (  1,      80000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

NOT SERVING ANY USER

T=          4
V=      30000
ARRIVALS....
        Start Time        | Finish Time          |   Start Queue       |   Finish Queue
USER#  (pos,          T)  | (pos,          T)  Q | (  U,          T)   | (  U,          T)
  0    (  0,      30003)  | (  0,      60006)  2 | (  0,      30003)   | (  0,      60006)
  1    (  1,      40000)  | (  1,      80000)  2 | (  1,      40000)   | (  1,      80000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

NOT SERVING ANY USER

T=          5
V=      40000
ARRIVALS
        Start Time        | Finish Time          |   Start Queue       |   Finish Queue
USER#  (pos,          T)  | (pos,          T)  Q | (  U,          T)   | (  U,          T)
  0    (  0,      30003)  | (  0,      60006)  2 | (  0,      30003)   | (  0,      60006)
  1    (  1,      40000)  | (  1,      80000)  2 | (  1,      40000)   | (  1,      80000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

SERVING U000

Start Time        | Finish Time          |   Start Queue       |   Finish Queue
USER#  (pos,          T)  | (pos,          T)  Q | (  U,          T)   | (  U,          T)
  0    (  1,      60006)  | (  1,      90009)  1 | (  1,      40000)   | (  1,      80000)
  1    (  0,      40000)  | (  0,      80000)  2 | (  0,      60006)   | (  0,      90009)
  2    (  4,     100000)  | (  4,     200000)  1 | (  4,     100000)   | (  1,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

T=          6
V=      50000
ARRIVALS
        Start Time        | Finish Time          |   Start Queue       |   Finish Queue
USER#  (pos,          T)  | (pos,          T)  Q | (  U,          T)   | (  U,          T)
  0    (  1,      60006)  | (  1,      90009)  2 | (  1,      40000)   | (  1,      80000)
  1    (  0,      40000)  | (  0,      80000)  2 | (  0,      60006)   | (  0,      90009)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

SERVING U001

Start Time        | Finish Time          |   Start Queue       |   Finish Queue
USER#  (pos,          T)  | (pos,          T)  Q | (  U,          T)   | (  U,          T)
  0    (  0,      60006)  | (  0,      90009)  2 | (  0,      60006)   | (  0,      90009)
  1    (  1,      80000)  | (  1,     120000)  1 | (  1,      80000)   | (  1,     120000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

T=          7
V=      60000
ARRIVALS....
        Start Time        | Finish Time          |   Start Queue       |   Finish Queue
USER#  (pos,          T)  | (pos,          T)  Q | (  U,          T)   | (  U,          T)
  0    (  0,      60006)  | (  0,      90009)  2 | (  0,      60006)   | (  0,      90009)
  1    (  1,      80000)  | (  1,     120000)  2 | (  1,      80000)   | (  1,     120000)
  2    (  4,     100000)  | (  4,     200000)  1 | (  4,     100000)   | (  4,     200000)
  3    (  3,     100000)  | (  3,     200000)  1 | (  3,     100000)   | (  3,     200000)
  4    (  2,     100000)  | (  2,     200000)  1 | (  2,     100000)   | (  2,     200000)

NOT SERVING ANY USER

T=          8
V=      70000
ARRIVALS....
```

RCVSQ_I_05

```
        Start Time         | Finish Time                   | Start Queue      | Finish Queue
USER# (pos,          T)    | (pos,          T)         Q | (  U,          T) | (  U,          T)
  0   (  0,     60006)     | (  0,      90009)         3 | (  0,      60006) | (  0,      90009)
  1   (  1,     80000)     | (  1,     120000)         2 | (  1,      80000) | (  1,     120000)
  2   (  4,    100000)     | (  4,     200000)         1 | (  4,     100000) | (  4,     200000)
  3   (  3,    100000)     | (  3,     200000)         1 | (  3,     100000) | (  3,     200000)
  4   (  2,    100000)     | (  2,     200000)         1 | (  2,     100000) | (  2,     200000)

SERVING U000

        Start Time         | Finish Time                   | Start Queue      | Finish Queue
USER# (pos,          T)    | (pos,          T)         Q | (  U,          T) | (  U,          T)
  0   (  1,     90009)     | (  1,     120012)         2 | (  1,      80000) | (  1,     120012)
  1   (  0,     80000)     | (  0,     120000)         2 | (  0,      90009) | (  0,     120012)
  2   (  4,    100000)     | (  4,     200000)         1 | (  4,     100000) | (  4,     200000)
  3   (  3,    100000)     | (  3,     200000)         1 | (  3,     100000) | (  3,     200000)
  4   (  2,    100000)     | (  2,     200000)         1 | (  2,     100000) | (  2,     200000)

I=        9
V=    80000
ARRIVALS....
        Start Time         | Finish Time                   | Start Queue        Finish Queue
USER# (pos,          T)    | (pos,          T)         Q | (  U,          T) | (  U,          T)
  0   (  1,     90009)     | (  1,     120012)         2 | (  1,      80000) | (  1,     120000)
  1   (  0,     80000)     | (  0,     120000)         2 | (  0,      90009) | (  0,     120012)
  2   (  4,    100000)     | (  4,     200000)         1 | (  4,     100000) | (  4,     200000)
  3   (  3,    100000)     | (  3,     200000)         1 | (  3,     100000) | (  3,     200000)
  4   (  2,    100000)     | (  2,     200000)         1 | (  2,     100000) | (  2,     200000)

SERVING U001

        Start Time         | Finish Time                   | Start Queue      | Finish Queue
USER# (pos,          T)    | (pos,          T)         Q | (  U,          T) | (  U,          T)
  0   (  0,     90009)     | (  0,     120012)         2 | (  0,      90009) | (  0,     120012)
  1   (  4,    120000)     | (  1,     160000)         1 | (  1,     100000) | (  1,     160000)
  2   (  3,    100000)     | (  4,     250000)         1 | (  3,     100000) | (  4,     200000)
  3   (  2,    100000)     | (  3,     200000)         1 | (  2,     100000) | (  3,     200000)
  4   (  1,    100000)     | (  2,     200000)         1 | (  1,     120000) | (  2,     200000)
con #          W          R         should send    did send    Max E      Max L
  0        0.333330 0.400000         3              2       0.000000 0.666500
  1        0.250000 0.300000         2              2       0.000000 0.500000
  2        0.100000 0.100000         1              0       0.000000 0.000000
  3        0.100000 0.100000         1              0       0.000000 0.000000
  4        0.100000 0.100000         1              0       0.000000 0.000000
```

What is claimed is:

1. A scheduler for controlling when N entities, where N is an integer $\geqq 2$, are operated upon by a server, each entity having a rate at which it is to receive service from the server, at least two entities having different rates, all rates of the entities total <1, comprising:

a starting time memory having arrival times $s_i$ of the N entities, where 1<i<N and is an integer, and $s_i$ corresponds to the time the i'th entity first requests service from the server;

a finishing time memory having finishing times $f_i$ of the N entities, where $f_i$ corresponds to the time the i'th entity is to be operated upon by the server;

a virtual clock that keeps track of time so the arrival times $s_i$ and finishing times $f_i$ can be identified; and a controller which chooses entities to be operated upon by the server in the order of the entities with an earliest finishing time $f_i$ and an arrival time $s_i$ being operated upon first, and then the entities with the earliest or latest starting time $s_i$ or having the highest or lowest id or rate if their finishing times are the same being operated upon next at each given time, with entities able to be operated upon by the server before their finishing time $f_i$, said controller causing the virtual clock to increment virtual time to the earliest start time of an entity if the earliest start time of an entity is later than virtual time, otherwise the controller causes the virtual clock to increment virtual time by a unit of virtual time.

2. An apparatus as described in claim 1 wherein the controller provides service to the entities from the server sequentially.

3. An apparatus as described in claim 1 wherein the controller causes the virtual clock to move present virtual time forward when an entity receives service from the server.

4. An apparatus as described in claim 3 wherein the starting time memory is a starting time priority queue and the finish time memory is a finishing time priority queue.

5. A scheduler as described in claim 4 including an element pool which is connected with the N entities and receives elements from the N entities to be operated upon by the server, and wherein the arrival times $s_i$ of elements corresponds to the time an element from the i'th entity arrives in the element pool and the finishing times $f_i$ compared to the time an element from the i'th entity is to leave the element pool and be operated upon by the server and the controller transfers elements to the server from the element pool.

6. An apparatus as described in claim 5 wherein the controller is connected to the virtual clock, the element pool, the starting time memory and the finishing time memory for controlling time of the virtual clock, storing the elements in the element pool and their arrival times $s_i$ and their finishing times $f_i$ in the starting time priority queue and the finishing time priority queue, respectively.

7. An apparatus as described in claim 6 wherein the controller transfers the element out of the element pool which has the earliest finishing time $f_i$ and a starting time $s_i$, unless there is more than one element with the earliest finishing time $f_i$ in which case the element with the earliest starting time $s_i$ is transferred out of the element pool by the controller and before its finishing time $f_i$.

8. A method of scheduling when a server provides service to entities, each entity having a rate at which it is to receive service from the server, at least two entities having different rates, all rates of the entities total $\leqq 1$, comprising the steps of:

requesting service from the server by N entities, where $N \geqq 1$ and is an integer;

storing respective request times associated with virtual times in a memory when each of the N entities first requests service from the server and respective receiving times associated with virtual times in the memory when each of the N entities is to have received service from the server;

providing an entity chosen by a controller of the N entities service which has the earliest receiving time and a request time later than virtual time, unless there is more than one entity with the earliest receiving time in which case the entity with the earliest request time later than virtual time is provided service by the server and possibly before its finishing time; and incrementing to the earliest request time of an entity if the earliest request time of an entity is later than virtual time, otherwise incrementing virtual time by a unit of virtual time with a virtual clock.

9. A method as described in claim 8 including after the providing step, there is the step of repeating the providing step in regard to other entities who have requested service from the server.

10. A scheduler for controlling when N entities, where N is an integer $\geqq 1$, are operated upon by a server comprising:

a starting time memory having starting times $s_i$ of the N entities, where 1<i<N and is an integer, and $s_i$ corresponds to the time the i'th entity first requests to be operated upon by the server;

a finishing time memory having finishing times $f_i$ of the N entities, where $f_i$ corresponds to the time the i'th entity is to have been operated upon by the server;

a virtual clock that keeps track of time so present virtual time, arrival times $s_i$ and finishing times $f_i$ can be identified; and a controller which chooses entities to be operated upon by the server in the order of the entity with an earliest finishing time $f_i$ and a starting time $s_i$ being operated upon first, and then the entities based on a predetermined criteria, said controller causing the virtual clock to increment virtual time to the earliest starting time of an entity if the earliest starting time of an entity is later than virtual time, otherwise, the controller causing the virtual clock to increment present virtual time by a unit of virtual time, said controller causing the virtual clock to increment virtual time to the earliest start time of an entity if the earliest start time of an entity is later than virtual time, otherwise the controller causes the virtual clock to increment virtual time by a unit of virtual time.

11. A scheduler for scheduling when N entities each of which has a weight w, where N is an integer $\geqq 1$ and w is a real number, are served by a server comprising:

a starting time memory having starting times $s_i$ when the N entities request service, where $1 > i \geqq N$ and is an integer, and $s_i$ is the time at which the i'th entity may next get service from the server;

a finishing time memory having finishing times $f_i$ when the N entities should be serviced, where $f_i$ is the time by which the i'th entity should be serviced by the server;

a virtual clock that keeps track of time $V_k$ where $k \geqq 0$ and is an integer and $$V_k = \mathrm{MAX}((V_{k-1}+P)+(1*X)+((1/AW)*T),\ (s_{Smin}*Y)+((f_{Fmin}-s_{Smin})*Z)) \text{ wherein } (|P|+|T''+|X|)*(|Y|+|Z|)>0$$

where $S_{Smin}$ is the earliest start time $s_i$ of when an entity requests service from the server, $f_{Fmin}$ is the earliest finish time of an entity waiting for service from the server, $V_{k-i}$ is the virtual time when the server last served an entity, AW=sum over all entities currently asking for service of $w_i$, where $w_i$ is the i'th entity's weight, and P, X, T, Y and Z are real numbers; and a controller which chooses which entity is to be operated upon by the server in the order of the entity with an earliest finishing time $f_i$ and a start time $s_i$ receiving service first, and then the entities based on a predetermined criteria, said controller causing the virtual clock to increment virtual time to the earliest start time of an entity if the earliest start time of an entity is later than virtual time otherwise the controller causes the virtual clock to increment virtual time by a unit of virtual time.

12. A method for scheduling when a server provides service to entities, each entity having a rate at which it is to receive service from the server, at least two entities having different rates, all rates of the entities total ≦1, comprising the steps of:

identifying a request time associated with a virtual time in a request time memory when a first entity requests service from the server and a receive time associated with a virtual time in a receive time memory when a second entity is to receive service from the server;

providing service to the second entity chosen by a controller as a function of the request time of the first entity and by the receive time if the request time is later than virtual time; and incrementing to the earliest request time of an entity if the earliest request time of an entity is later than virtual time, otherwise incrementing virtual time by a unit of virtual time with a virtual clock.

13. A method as described in claim 12 wherein the identifying step includes the step of identifying when the first entity first requests service from the server.

14. A scheduler for controlling when a server provides service to entities comprising:

a memory having times which are a function of when entities request service from the server;

a virtual clock that keeps track of time as a function of when entities request service from the server; and a controller which causes an entity to receive service from the server as a function of when the entity requests service from the server, said controller causing the virtual clock to increment virtual time to the earliest start time of an entity if the earliest start time of an entity is later than virtual time, otherwise the controller causes the virtual clock to increment virtual time by a unit of virtual time.

15. A method for scheduling when a server provides service to entities, each entity having a rate at which it is to receive service from the server, at least two entities having different rates, all rates of the entities total ≦1, comprising the steps of:

identifying a request time associated with a virtual time in memory when an entity requests service from the server and a receive time associated with a virtual time in the memory when the entity is to receive service from the server;

providing service to the entity chosen by a controller as a function of the request time of the entity and by the receive time if the request time is later than virtual time; and incrementing to the earliest request time of an entity if the earliest request time of an entity is later than virtual time, otherwise incrementing virtual time by a unit of virtual time with a virtual clock.

16. A method for scheduling when a server provides service to entities, each entity having a rate at which it is to receive service from the server, at least two entities having different rates, all rates of the entities total ≦1, comprising the steps of:

identifying a request time associated with a virtual time in a memory when an entity requests service from the server and a receive time associated with a virtual time in the memory when the entity is to receive service from the server;

providing service to the entity as a functions of a second entity currently receiving service from the server and by the receive time if the request time is later than virtual time; and incrementing to the earliest request time of an entity if the earliest request time of an entity is later than virtual time, otherwise incrementing virtual time by a unit of virtual time with a virtual clock.

17. A method for servicing entities comprising the steps of:

requesting service from a server by a first entity;

storing the starting time of the first entity in regard to when the first entity requests service from the server, and storing the finishing time of the first entity in regard to when the first entity is to be operated upon by the server;

requesting service from a server by a second entity;

storing the starting time of the second entity in regard to when the second entity requests service from the server, and storing the finishing time of the second entity in regard to when the second entity is to be operated upon by the service, said starting time of the second entity later than the starting time of the first entity, said finishing time of the second entity earlier than the finishing time of the first entity;

providing service to the second entity from the server;

incrementing virtual time by a unit of virtual time: and providing service to the first entity from the server after providing service to the second entity from the server.

18. A scheduler as described in claim 1 wherein said controller chooses an element to be operated upon by the server such that said element is to be operated upon by the server at the same virtual time.

19. A method as described in claim 8 wherein the providing step includes the step of transferring an element of N elements at a same virtual time out of the first location.

20. A scheduler as described in claim 1 wherein the virtual clock keeps track of virtual time so each request for service from the server by an entity is schedulable and each entity will receive service from the server.

* * * * *